US012117755B2

(12) United States Patent
Ubukata et al.

(10) Patent No.: US 12,117,755 B2
(45) Date of Patent: Oct. 15, 2024

(54) CONTROL DEVICE, IMAGE FORMING APPARATUS, IMAGE FORMING METHOD, AND STORAGE MEDIUM

(71) Applicants: Kanji Ubukata, Kanagawa (JP); Koji Kiryu, Tokyo (JP); Masashi Kasamai, Kanagawa (JP); Jumpei Yamaguchi, Kanagawa (JP); Masahiro Ashikawa, Kanagawa (JP); Nagisa Nakamura, Shizuoka (JP)

(72) Inventors: Kanji Ubukata, Kanagawa (JP); Koji Kiryu, Tokyo (JP); Masashi Kasamai, Kanagawa (JP); Jumpei Yamaguchi, Kanagawa (JP); Masahiro Ashikawa, Kanagawa (JP); Nagisa Nakamura, Shizuoka (JP)

(73) Assignee: Ricoh Company, Ltd., Tokyo (JP)

( * ) Notice: Subject to any disclaimer, the term of this patent is extended or adjusted under 35 U.S.C. 154(b) by 79 days.

(21) Appl. No.: 18/046,207

(22) Filed: Oct. 13, 2022

(65) Prior Publication Data

US 2023/0134616 A1 May 4, 2023

(30) Foreign Application Priority Data

Oct. 28, 2021 (JP) ................................ 2021-176789
Sep. 5, 2022 (JP) ................................ 2022-140572

(51) Int. Cl.
*G03G 15/00* (2006.01)
*G03G 15/01* (2006.01)

(52) U.S. Cl.
CPC ......... *G03G 15/5025* (2013.01); *G03G 15/01* (2013.01)

(58) Field of Classification Search
CPC .......................... G03G 15/01; G03G 15/5025
See application file for complete search history.

(56) References Cited

U.S. PATENT DOCUMENTS

2006/0222418 A1* 10/2006 Ebara .................. G03G 15/011 399/301
2007/0041753 A1 2/2007 Kiryu
(Continued)

FOREIGN PATENT DOCUMENTS

| | | |
|---|---|---|
| JP | 2005-094987 | 4/2005 |
| JP | 2014-178404 | 9/2014 |
| JP | 2020-177098 | 10/2020 |

OTHER PUBLICATIONS

U.S. Appl. No. 17/876,562, filed Jul. 29, 2022, Nagisa Nakamura, et al.

(Continued)

*Primary Examiner* — Walter L Lindsay, Jr.
*Assistant Examiner* — Andrew V Do
(74) *Attorney, Agent, or Firm* — IPUSA, PLLC

(57) ABSTRACT

A control device includes circuitry. The circuitry detects density unevenness of a toner image occurring according to a rotation cycle of a plurality of image bearers based on rotation phases and toner image density of the plurality of image bearers, controls rotation phases and rotation speeds of the plurality of image bearers, corrects the rotation phases and the rotation speeds of the plurality of image bearers, controls the rotation speeds of at least two of the plurality of image bearers to be a specified rotation speed, and starts a detection operation of the rotation phases of the plurality of image bearers after a difference between each of the rotation speeds of the at least two of the plurality of image bearers and the specified rotation speed falls within a specified range.

17 Claims, 25 Drawing Sheets

(56) References Cited

U.S. PATENT DOCUMENTS

| | | | |
|---|---|---|---|
| 2007/0048017 A1 | 3/2007 | Kiryu | |
| 2010/0008689 A1 | 1/2010 | Iwasaki et al. | |
| 2010/0034565 A1 | 2/2010 | Ashikawa et al. | |
| 2010/0239282 A1 | 9/2010 | Ashikawa et al. | |
| 2010/0239293 A1 | 9/2010 | Ishizaki et al. | |
| 2011/0229159 A1 | 9/2011 | Kiryu | |
| 2012/0237240 A1 | 9/2012 | Kiryu | |
| 2012/0274986 A1* | 11/2012 | Harashima | G03G 15/5058 358/3.21 |
| 2013/0121715 A1 | 5/2013 | Ashikawa et al. | |
| 2014/0255063 A1 | 9/2014 | Kiryu | |
| 2014/0268242 A1 | 9/2014 | Kaneko et al. | |
| 2014/0306633 A1 | 10/2014 | Ashikawa | |
| 2017/0153658 A1 | 6/2017 | Kasamai et al. | |
| 2018/0093841 A1 | 4/2018 | Momose et al. | |
| 2021/0278785 A1 | 9/2021 | Ashikawa | |

OTHER PUBLICATIONS

U.S. Appl. No. 17/731,280, filed Apr. 28, 2022, Jumpei Yamaguchi, et al.

* cited by examiner

| FIG. 18A |
| --- |
| FIG. 18B |

CONTROL DEVICE, IMAGE FORMING APPARATUS, IMAGE FORMING METHOD, AND STORAGE MEDIUM

CROSS-REFERENCE TO RELATED APPLICATIONS

This patent application is based on and claims priority pursuant to 35 U.S.C. § 119(a) to Japanese Patent Application Nos. 2021-176789, filed on Oct. 28, 2021, and 2022-140572, filed on Sep. 5, 2022, in the Japan Patent Office, the entire disclosure of which is hereby incorporated by reference herein.

BACKGROUND

Technical Field

Embodiments of the present disclosure relate to a control device, an image forming apparatus, an image forming method, and a storage medium.

Related Art

Some technologies have been proposed that control the rotation speed of an image bearer to correct density unevenness that occurs according to a rotation cycle of the image bearer due to an eccentricity of the image bearer in an image forming apparatus including multiple image bearers.

SUMMARY

In an embodiment of the present disclosure, there is provided a control device that includes circuitry. The circuitry detects density unevenness of a toner image occurring according to a rotation cycle of a first image bearer for a first color among a plurality of rotatable image bearers, based on a rotation phase of the first image bearer and a density of the toner image formed on the first image bearer, detects density unevenness of a toner image occurring according to a rotation cycle of a second image bearer for a second color among the plurality of image bearers, based on a rotation phase of the second image bearer and a density of the toner image formed on the second image bearer, controls rotation phases of the plurality of image bearers based on detection results of the plurality of image bearers and rotation speeds of the plurality of image bearers, corrects the rotation phase of the first image bearer based on a detection result of the first image bearer and a rotation speed of the first image bearer, corrects the rotation phase of the second image bearer based on a detection result of the second image bearer and a rotation speed of the second image bearer, controls the rotation speeds of at least two of the plurality of image bearers to be a specified rotation speed, and starts a detection operation of the rotation phases of the plurality of image bearers after a difference between each of the rotation speeds of the at least two of the plurality of image bearers and the specified rotation speed falls within a specified range.

In another embodiment of the present disclosure, there is provided an image forming apparatus that includes the control device, the plurality of image bearers, and a plurality of forming devices that form toner images on the plurality of image bearers.

In still another embodiment of the present disclosure, there is provided an image forming method for an image forming apparatus that includes forming toner images on a plurality of rotatable image bearers with a plurality of forming devices of the image forming apparatus, detecting density unevenness of a toner image occurring according to a rotation cycle of a first image bearer among the plurality of image bearers, based on a rotation phase of the first image bearer and a density of the toner image formed on the first image bearer, detecting density unevenness of a toner image occurring according to a rotation period of a second image bearer among the plurality of image bearers, based on a rotation phase of the second image bearer and a density of the toner image formed on the second image bearer, controlling rotation phases of the plurality of image bearers based on detection results of the plurality of image bearers and rotation speeds of the plurality of image bearers, correcting the rotation phase of the first image bearer based on a detection result of the first image bearer and a rotation speed of the first image bearer, correcting the rotation phase of the second image bearer based on a detection result of the second image bearer and a rotation speed of the second image bearer, controlling rotation speeds of at least two of the plurality of image bearers to be a specified rotation speed, and starting a detection operation of the rotation phases of the plurality of image bearers after a difference between each of the rotation speeds of the at least two of the plurality of image bearers and the specified rotation speed falls within a specified range.

In still yet another embodiment of the present disclosure, there is provided a non-transitory storage medium storing a plurality of instructions which, when executed by one or more processors, cause the processors to execute a method that includes forming toner images on a plurality of rotatable image bearers with a plurality of forming devices of an image forming apparatus, detecting density unevenness of a toner image occurring according to a rotation cycle of a first image bearer among the plurality of image bearers, based on a rotation phase of the first image bearer and a density of the toner image formed on the first image bearer, detecting density unevenness of a toner image occurring according to a rotation period of a second image bearer among the plurality of image bearers, based on a rotation phase of the second image bearer and a density of the toner image formed on the second image bearer, controlling rotation phases of the plurality of image bearers based on detection results of the plurality of image bearers and rotation speeds of the plurality of image bearers, correcting the rotation phase of the first image bearer based on a detection result of the first image bearer and a rotation speed of the first image bearer, correcting the rotation phase of the second image bearer based on a detection result of the second image bearer and a rotation speed of the second image bearer, controlling rotation speeds of at least two of the plurality of image bearers to be a specified rotation speed, and starting a detection operation of the rotation phases of the plurality of image bearers after a difference between each of the rotation speeds of the at least two of the plurality of image bearers and the specified rotation speed falls within a specified range.

BRIEF DESCRIPTION OF THE DRAWINGS

A more complete appreciation of embodiments of the present disclosure and many of the attendant advantages and features thereof can be readily obtained and understood from the following detailed description with reference to the accompanying drawings, wherein.

Figure 1:
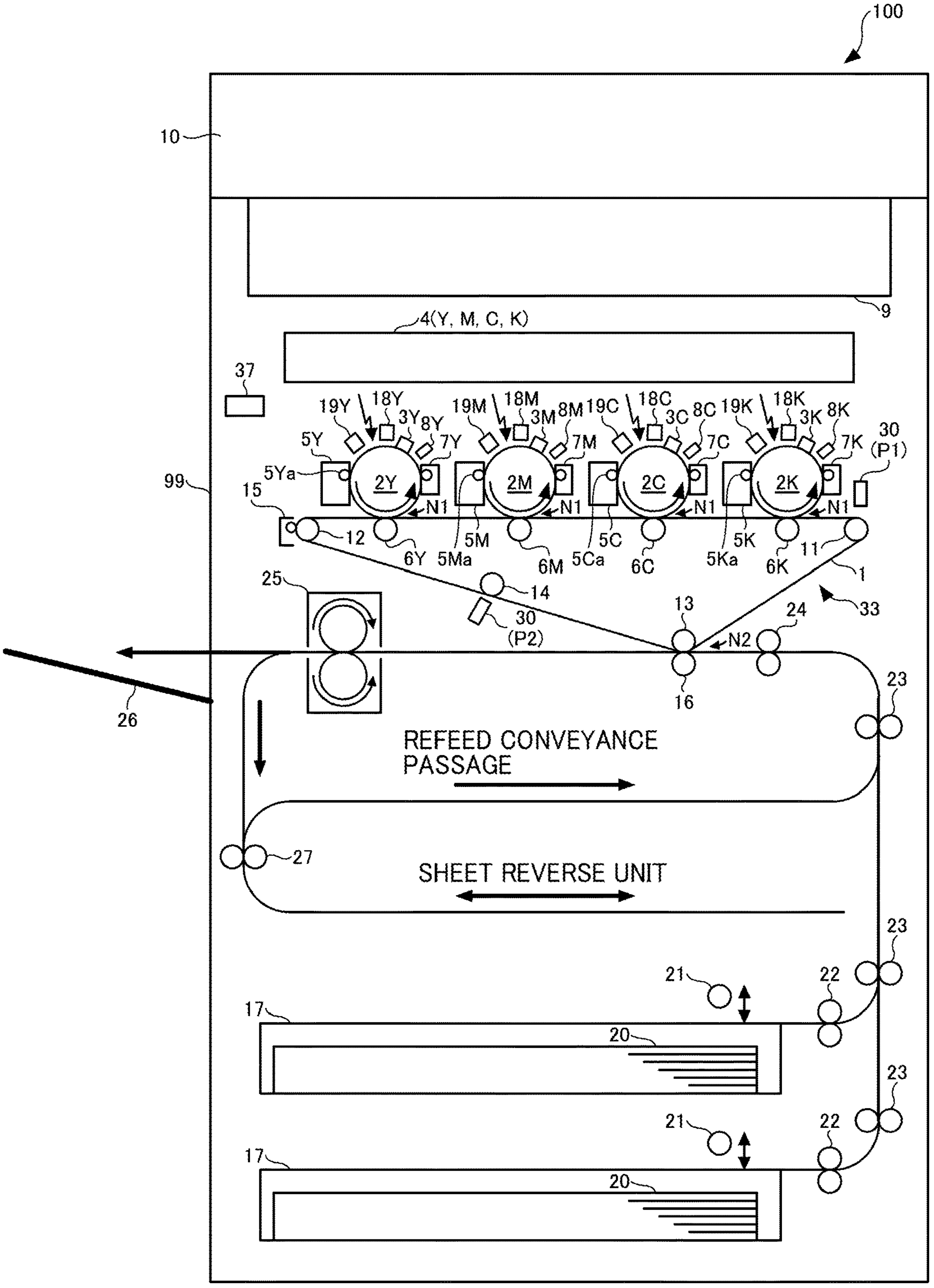
FIG. 1 is a diagram illustrating an overall configuration of an image forming apparatus according to a first embodiment of the present disclosure.

The accompanying drawings are intended to depict embodiments of the present disclosure and should not be interpreted to limit the scope thereof. The accompanying drawings are not to be considered as drawn to scale unless explicitly noted. Also, identical or similar reference numerals designate identical or similar components throughout the several views.

DETAILED DESCRIPTION

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

Referring now to the drawings, embodiments of the present disclosure are described below. As used herein, the singular forms "a," "an," and "the" are intended to include the plural forms as well, unless the context clearly indicates otherwise.

An image forming apparatus including a control device according to an embodiment is described below as an example.

FIG. 1 is a diagram illustrating an overall configuration of an image forming apparatus 100 according to an embodiment of the present disclosure. The image forming apparatus 100 is an electrophotographic image forming apparatus and is a quadruple-tandem-type full-color machine employing an intermediate transfer method. However, the embodiment can also be applied to other image forming apparatuses such as a quadruple-tandem-type full-color machine employing a direct transfer method, a one-drum-type full-color machine employing an intermediate transfer method, and a one-drum-type monochrome machine employing a direct transfer method.

As illustrated in FIG. 1, the image forming apparatus 100 includes an intermediate transfer belt 1. The image forming apparatus 100 further includes photoconductor drums 2Y, 2M, 2C, and 2K (serving as image bearers) arranged along an extension surface, in other words, a stretched surface of the intermediate transfer belt 1. One of the photoconductor drums 2Y, 2M, 2C, and 2K corresponds to an image bearer for a first color. One of the photoconductor drums 2Y, 2M, 2C, and 2K other than the image bearer for the first color corresponds to an image bearer for a second color. One of the photoconductor drums 2Y, 2M, 2C, and 2K other than the image bearers for the first and second colors corresponds to an image bearer for a third color.

Suffixes Y, M, C, and K represent yellow, magenta, cyan, and black, respectively. When an image forming station (serving as an image forming device) for yellow is described as a representative, the image forming apparatus 100 includes the following configuration around the photoconductor drum 2Y in an order of the rotation direction thereof. The photoconductor drums 2Y, 2M, 2C, and 2K are collectively referred to as photoconductor drums 2 without suffixes when the photoconductor drums 2Y, 2M, 2C, and 2K are not particularly distinguished from one another. Similarly, components provided for the respective colors, such as a toner density sensor, a charger, an optical writing unit, and a developing unit, which are described later, are collectively referred to without suffixes when the components are not distinguished from each other.

The image forming apparatus 100 includes a charger 3Y and a photointerrupter 18Y (serving as a rotation-phase detection device) that detects a rotation phase of the photoconductor drum 2Y The image forming apparatus 100 further includes an optical writing unit 4Y that writes an electrostatic latent image by exposing the photoconductor drum 2Y and a toner density sensor 19Y that detects the density of the toner image formed on the photoconductor drum 2Y.

The toner density sensor 19Y includes, for example, an optical sensor. The image forming apparatus 100 further includes a developing unit 5Y, a primary transfer roller 6Y, a photoconductor cleaning unit 7Y including a blade and a brush, and a charge eliminating unit 8Y.

A forming unit that forms a toner image on the photoconductor drum 2Y includes the charger 3Y, the optical writing unit 4Y, and the developing unit 5Y. The image forming apparatus 100 can transfer the toner image formed on the photoconductor drum 2Y by the forming unit onto the intermediate transfer belt 1 by the primary transfer roller 6Y. The same applies to other colors.

The intermediate transfer belt 1 is rotatably supported by a plurality of rollers 11, 12, and 13. The image forming apparatus 100 includes a belt cleaning unit 15 including a blade and a brush at a position opposite the roller 12. An intermediate transfer unit 33 includes the intermediate transfer belt 1, the rollers 11, 12, and 13, and the belt cleaning unit 15. The image forming apparatus 100 includes a secondary transfer roller 16 for secondarily transferring the toner image formed on the intermediate transfer belt 1 onto a recording sheet 20 at a position opposite the roller 13.

The image forming apparatus 100 further includes, for example, a scanner 9 as an image reader and an automatic document feeder (ADF) 10 as an automatic document feeder vertically above the optical writing unit 4 including the optical writing units 4Y, 4C, 4M, and 4K.

The image forming apparatus 100 includes sheet trays 17 in a lower portion of an apparatus body 99. In the image forming apparatus 100, a control unit 37 controls a pickup roller 21 and a sheet feed roller 22 to feed the recording sheet 20 as a recording medium stored in each sheet tray 17 and controls a conveying roller pair 23 to convey the recording sheet 20. In the image forming apparatus 100, the control unit 37 controls a registration roller pair 24 to send the recording sheet 20 at a specified timing to a nip portion N2 which is a secondary transfer portion where the intermediate transfer belt 1 and the secondary transfer roller 16 face each other.

The image forming apparatus 100 includes a fixing unit 25 as a fixing device downstream from the nip portion N2 in a sheet conveyance direction. In FIG. 1, the image forming apparatus 100 includes an output tray 26, a switchback roller pair 27, and the control unit 37.

The developing units 5Y, 5C, 5M, and 5K include developing rollers 5Ya, 5Ca, 5Ma, and 5Ka which are rotators as developer bearers disposed opposite the photoconductor drums 2Y, 2C, 2M, and 2K with developing gaps of specified distances, respectively. The developing rollers 5Ya, 5Ca, 5Ma and 5Ka bear two-component developer containing toner and carrier stored in the developing units 5Y, 5C, 5M and 5K, respectively. The developing rollers 5Ya, 5Ca, 5Ma, and 5Ka cause the toner in the borne two-component developer to adhere to the photoconductor drums 2Y, 2C, 2M, and 2K at developing nips opposite the photoconductor drums 2Y, 2C, 2M, and 2K, thereby forming the toner images on the photoconductor drums 2Y, 2C, 2M, and 2K, respectively.

In the present embodiment, the image forming apparatus 100 includes the photointerrupters 18Y, 18C, 18M, and 18K as detection devices that detects rotation positions of the photoconductor drums 2Y, 2C, 2M, and 2K. However, the present disclosure is not limited thereto, and the image forming apparatus 100 may include a configuration for detecting the rotation position of, for example, a rotary encoder 230. The same applies to the rotation position detection device that detects the rotation positions, i.e., phases of the developing rollers 5Ya, 5Ca, 5Ma, and 5Ka.

A laser controller causes the optical writing units 4Y, 4C, 4M, and 4K to drive four semiconductor lasers based on image data. The optical writing units 4Y, 4C, 4M, and 4K emit four writing lights in the dark to irradiate the photoconductor drums 2Y, 2C, 2M, and 2K which are uniformly charged by the chargers 3Y, 3C, 3M, and 3K, respectively. The optical writing units 4Y, 4C, 4M, and 4K scan the photoconductor drums 2Y, 2C, 2M, and 2K in the dark with the writing lights to write electrostatic latent images for Y, C, M, and K on the surfaces of the photoconductor drums 2Y, 2C, 2M, and 2K, respectively.

In the present embodiment, the optical writing units 4Y, 4C, 4M, and 4K perform optical scanning with laser beams emitted from the laser diodes as follows. In the optical writing unit 4Y, 4C, 4M, and 4K, the laser beams emitted by the laser diodes are deflected by a polygon mirror, reflected by a reflection mirror, and passed through the optical lenses. Thus, the optical writing unit 4Y, 4C, 4M, and 4K perform optical scanning. Each of the optical writing units 4Y, 4C, 4M, and 4K may include a unit that performs optical writing using a light-emitting diode (LED) array instead of the laser diode.

An image forming operation of the image forming apparatus 100 is described below. In response to an input of an order to start a print job, the rollers around the photoconductor drums 2Y, 2C, 2M, and 2K, the intermediate transfer belt 1, and a feed conveyance passage start rotating at their specified timings. Thus, the recording sheet 20 is fed from one of the sheet trays 17.

On the other hand, the surfaces of the photoconductor drums 2Y, 2M, 2C, and 2K are charged to a uniform potential by the chargers 3Y, 3M, 3C, and 3K, and the surfaces of the photoconductor drums 2Y, 2M, 2C, and 2K are exposed by the writing lights emitted from the optical writing units 4Y, 4M, 4C, and 4K according to the image data. A potential pattern after exposure is called an electrostatic latent image. Toner is supplied from the developing units 5Y, 5M, 5C, and 5K to the surfaces of the photoconductor drums 2Y, 2M, 2C, and 2K bearing the electrostatic latent images, so that the electrostatic latent images borne on the photoconductor drums 2Y, 2M, 2C, and 2K are developed into specified colors.

In the configuration of FIG. 1, since the photoconductor drums 2Y, 2M, 2C, and 2K have four colors, the toner images of yellow, magenta, cyan, and black (the order of colors differs depending on the system) are developed on the photoconductor drums 2Y, 2M, 2C, and 2K, respectively.

The toner images developed on the photoconductor drums 2Y, 2M, 2C, and 2K are transferred onto the intermediate transfer belt 1 at nip portions N1 (serving as primary transfer portions), which are contact points between the photoconductor drums 2Y, 2M, 2C, and 2K and the intermediate transfer belt 1, respectively. That is, the toner image is transferred onto the intermediate transfer belt 1 by a primary transfer bias and a pressing force applied to each of the primary transfer rollers 6Y, 6M, 6C, and 6K disposed opposite the photoconductor drums 2Y, 2M, 2C, and 2K. The image forming apparatus 100 forms a full-color toner image on the intermediate transfer belt 1 by repeating this primary transfer operation for four colors while adjusting the timing.

In the image forming apparatus 100, the full-color toner image formed on the intermediate transfer belt 1 is transferred to the recording sheet 20 conveyed by the registration roller pair 24 at a proper timing in the nip portion N2. At this time, the secondary transfer is performed by a secondary transfer bias and a pressing force applied to the secondary transfer roller 16. The image forming apparatus 100 causes the recording sheet 20 to which the full-color toner image is transferred to pass through the fixing unit 25, thereby heating and fixing the toner image borne on the surface of the recording sheet 20.

In the case of single-sided printing, the image forming apparatus 100 linearly conveys the recording sheet 20 as it is to the output tray 26. In the case of double-sided printing, the image forming apparatus 100 changes the conveyance direction to downward and conveys the recording sheet 20 to a sheet reverse unit. In the image forming apparatus 100, the conveyance direction of the recording sheet 20 that has reached the sheet reverse unit is reversed by the switchback roller pair 27, and the recording sheet 20 is ejected from the sheet reverse unit from a trailing end of the sheet. This is called a switchback operation. The front and back of the recording sheet 20 are reversed by this operation. The reversed recording sheet 20 does not return to the fixing unit 25, passes through a refeed conveyance passage, and joins an original sheet feed passage. Thereafter, the image forming apparatus 100 transfers the toner image in the same manner as in the front surface printing, passes the toner image through the fixing unit 25, and ejects the sheet. This is a double-sided print operation.

The photoconductor drums 2Y, 2M, 2C, and 2K that have passed through the nip portions N1 bear primary-transfer residual toner on the surfaces thereof. The photoconductor cleaning units 7Y, 7M, 7C, and 7K of the image forming apparatus 100 remove the primary-transfer residual toner. Thereafter, the charge eliminating units 8Y, 8M, 8C, and 8K of the image forming apparatus 100 uniformly eliminate charge of the surfaces thereof to prepare for charging of the next image formation. The intermediate transfer belt 1 that has passed through the nip portion N2 also bears the secondary-transfer residual toner on the surfaces thereof. The belt cleaning unit 15 of the image forming apparatus 100 removes the secondary-transfer residual toner to prepare for the transfer of the next toner image. The image forming apparatus 100 performs single-sided printing or double-sided printing by repeating such operations.

The image forming apparatus 100 includes a toner-image detection sensor 30 as an optical sensor unit that includes the optical sensor. The toner-image detection sensor 30 detects density of the toner image formed on an outer circumferential surface of the intermediate transfer belt 1.

The toner-image detection sensor 30 functions as a toner-adhesion-amount detection sensor that detects the density of a toner image that is the image on the intermediate transfer belt 1 in order to detect the adhesion amount of toner on the intermediate transfer belt 1 and detect density unevenness of the image.

The toner-image detection sensor 30 of the image forming apparatus 100 detects the density of the toner image of an image pattern for correction control formed on the surface of the intermediate transfer belt 1 for use in correction control of unevenness of the image.

In the configuration example illustrated in FIG. 1, the image forming apparatus 100 includes the toner-image detection sensor 30 in a position P1 before secondary transfer, which is a position facing a portion of the intermediate transfer belt 1 wound around the roller 11. The image forming apparatus 100 may include the toner-image detection sensor 30 at a position P2 after the secondary transfer, which is a position downstream from the nip portion N2. In a case where the toner-image detection sensor 30 is disposed downstream from the nip portion P2 such as the position P2, the toner-image detection sensor 30 as follows is preferably disposed. A roller 14 for preventing vibration of the intermediate transfer belt 1 inside the intermediate transfer belt 1 is preferably disposed, and the toner-image detection sensor 30 is preferably disposed to face the roller 14.

Of the two kinds of arrangement positions in the toner-image detection sensor 30, the position P1 before the secondary transfer is a position where the toner pattern on the intermediate transfer belt 1 before the secondary transfer step is detected. This configuration is often adopted if there is no restriction on the layout of the apparatus. Since the toner image of the image pattern for correction control is detected immediately after the toner image is formed, the waiting time is short and the toner image of the image pattern does not need to be passed through the nip portion N2. Thus, a contrivance therefor is not required.

However, there are many models in which the position immediately downstream from the image forming station of the fourth color (black in the example of FIG. 1) is a secondary transfer position such as the nip portion N2. In such a case, installing a sensor in the position P1 is difficult in terms of space. In such a case, the toner-image detection sensor 30 is disposed at the position P2 which is the position after the secondary transfer, and the toner image of the image pattern formed on the intermediate transfer belt 1 is passed through the nip portion N2. Thus, the density of the toner image is detected by the toner-image detection sensor 30. As a method of passing through the nip portion N2, for example, separation of the secondary transfer roller 16 from the intermediate transfer belt 1 or application of a reverse bias to the secondary transfer roller 16 can be considered. The way is not particularly limited here.

Figure 2A:
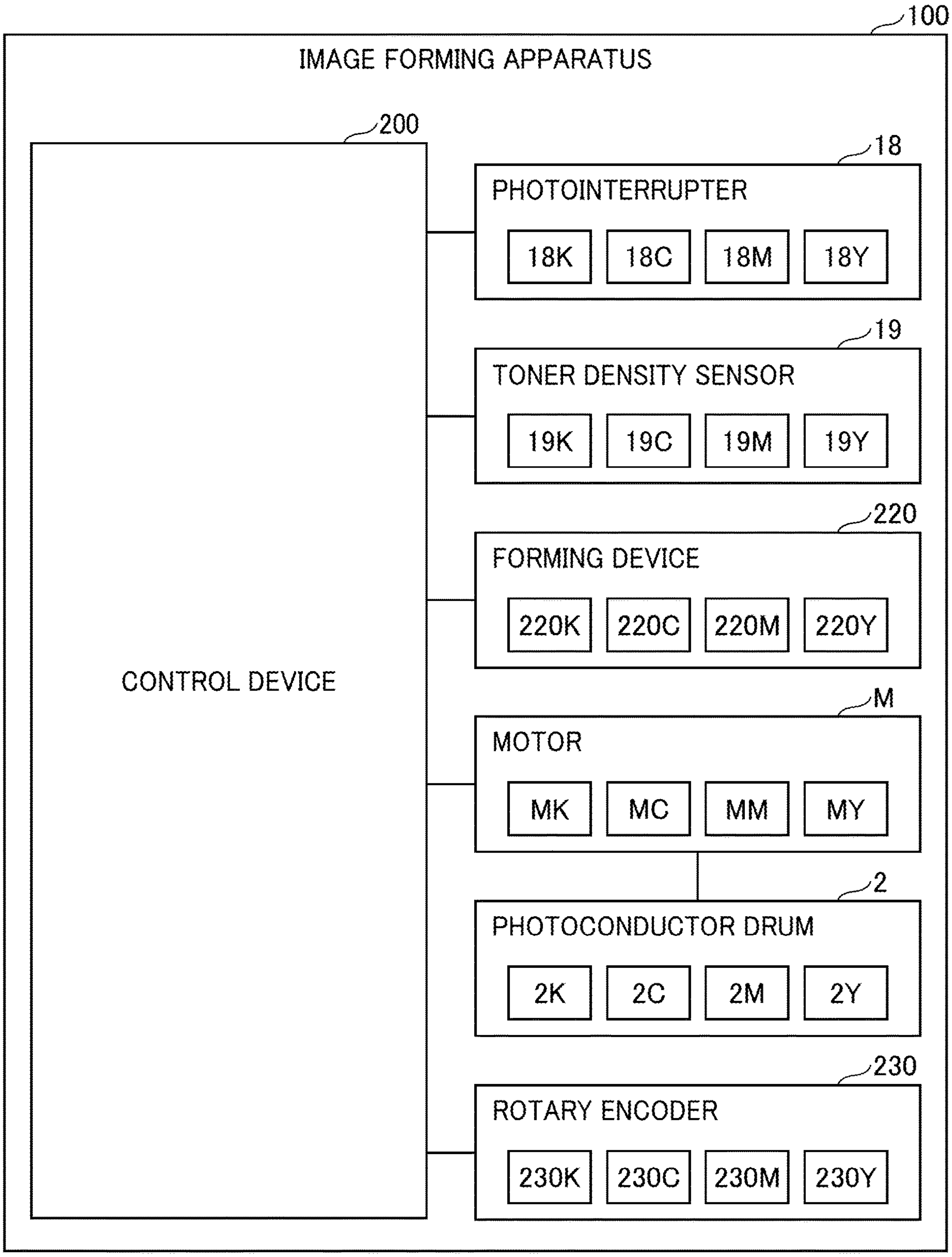
FIG. 2A is a block diagram illustrating a configuration of the image forming apparatus of FIG. 1.

FIG. 2A is a block diagram illustrating a configuration of the image forming apparatus 100. As illustrated in FIG. 2A, the image forming apparatus 100 includes a control device 200, the photointemipters 18, the toner density sensors 19, forming devices 220, a motor M, the photoconductor drums 2, and rotary encoders 230. The photointerrupters 18K, 18C, 18M, and 18Y are disposed corresponding to the photoconductor drums 2Y, 2C, 2M, and 2K, respectively. Although the toner density sensors are not disposed for the respective colors, the toner density sensors 19K, 19C, 19M, and 19Y are disposed in the image forming apparatus 100. The forming devices 220K, 220C, 220M and 220Y for the respective colors and the motors MK, MC, MM and MY for the respective colors are disposed in the image forming apparatus 100. The rotary encoders 230K, 230C, 230M, and 230Y are also disposed for the respective colors in the image forming apparatus 100.

Figure 2B:
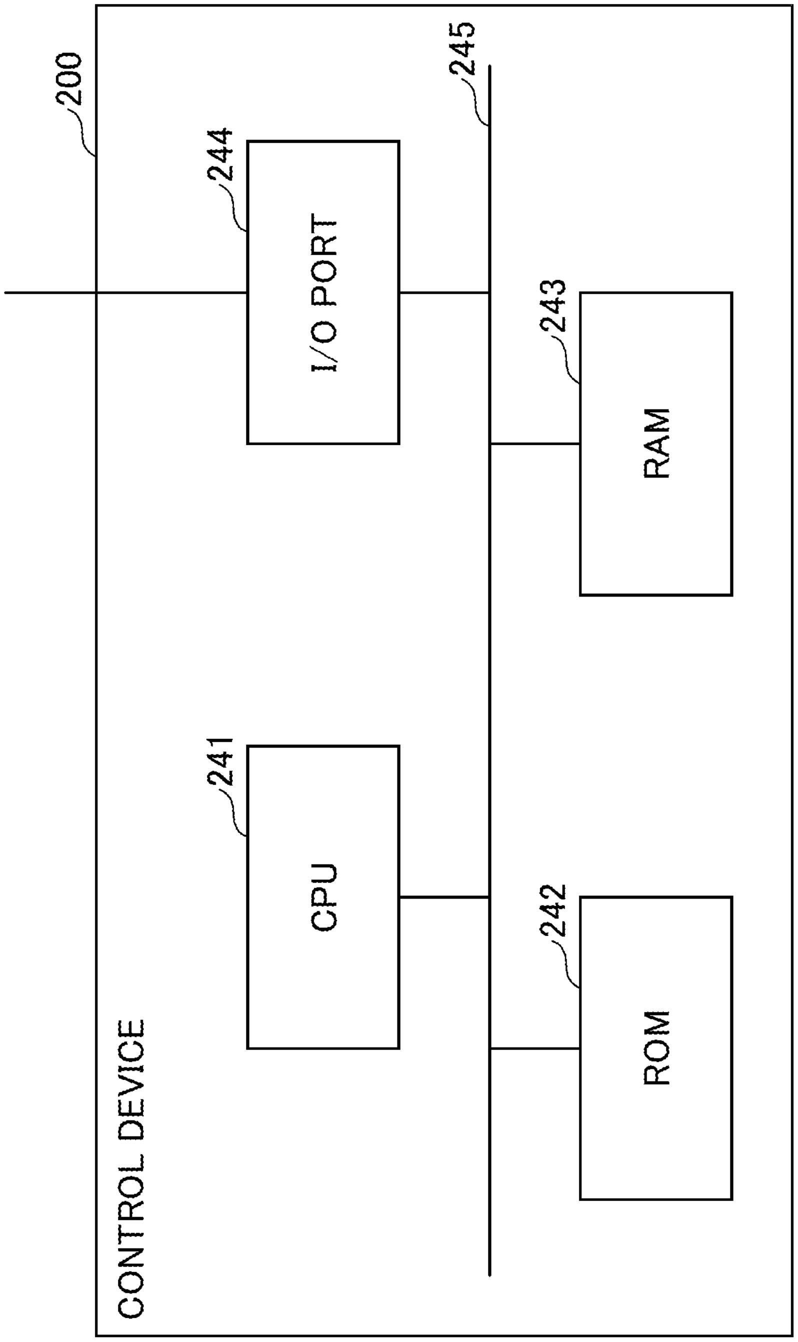
FIG. 2B is a block diagram illustrating a hardware configuration of a control device of the image forming apparatus of FIG. 1.

FIG. 2B is a block diagram illustrating the hardware configuration of the control device 200. As illustrated in FIG. 2B, the control device 200 includes a central processing unit (CPU) 241, a read only memory (ROM) 242, a random access memory (RAM) 243, and an input-and-output (I/O) port 244.

The CPU 241 is an arithmetic device that sequentially executes, e.g., branching processing or iterative processing by executing a program stored in the ROM 242. The ROM 242 is a non-volatile memory in which a program executed in the CPU 241 is stored.

The RAM 243 is a memory that functions as a work area (working area) for the operation of the CPU 241. A bus line 245 is, e.g., an address bus or a data bus to electrically connect the components such as the CPU 241.

The I/O port 244 is an interface to which an output signal of the photointerrupter 18, an output signal of the toner density sensor 19, an output signal of the rotary encoder 230, and the like are input. The I/O port 244 is also an interface that outputs a control signal for controlling the forming device 220 and a control signal for controlling the motor M.

The functions of the control device 200 may be implemented with an electronic circuit such as an application specific integrated circuit (ASIC) or a field programmable gate array (FPGA) instead of the CPU 241. Each of the functions described below may be implemented with, for example, s a CPU, an ASIC, or an FPGA, or the functions may be implemented with a common CPU, ASIC, or FPGA.

Figure 2C:
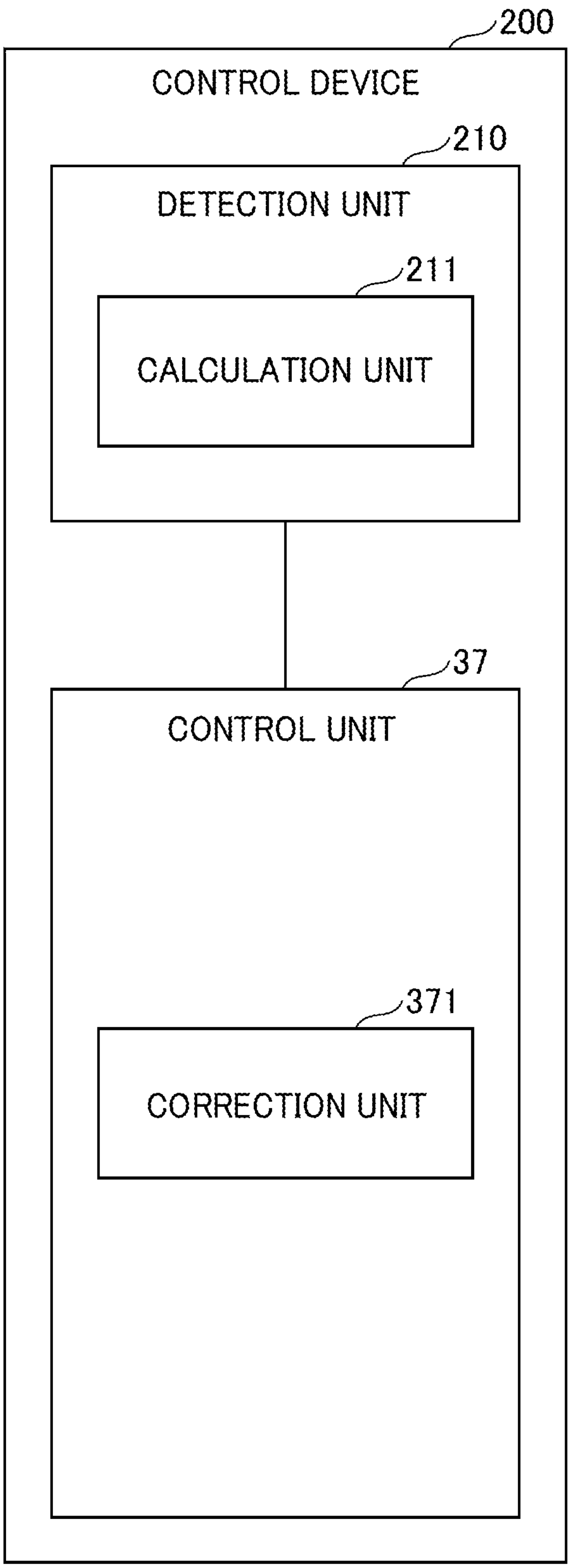
FIG. 2C is a block diagram illustrating a functional configuration of the control device of the image forming apparatus in FIG. 1.

FIG. 2C is a block diagram illustrating a functional configuration of the control device 200. A description is given with reference to FIG. 2A as appropriate. The control device 200 includes a detection unit 210 and the control unit 37.

The detection unit 210 detects the density unevenness of the toner image generated according to the rotation cycle of the photoconductor drum 2 based on the rotation phase of each of the four photoconductor drums 2 detected by the photointerrupters 18 and the density of the toner image formed on the photoconductor drum 2 detected by the toner density sensor 19.

In the present embodiment, the detection unit 210 starts the detecting operation of the rotation phase of each of the four photoconductor drums 2 when the difference between the rotation speed of at least two photoconductor drums 2 and a specified rotation speed is within a specified range.

The detection unit 210 includes a calculation unit 211. In the present embodiment, the calculation unit 211 starts a calculation for calculating the rotation phase when the operation for detecting the rotation phase of at least two photoconductor drums 2 among the four photoconductor drums 2 have ended.

The control unit 37 controls the rotation speed of the photoconductor drum 2 by controlling the rotation of the motor M based on the detection result by the detection unit 210 and the rotation speed of each of the four photoconductor drums 2 detected by the rotary encoder 230.

In the present embodiment, the control unit 37 performs control such that at least two of the four photoconductor drums 2 have the specified rotation speed when the four photoconductor drums 2 start to rotate.

The control unit 37 includes a correction unit 371. In the present embodiment, the correction unit 371 starts the correction of the density unevenness when the calculation for calculating the rotation phases of at least two photoconductor drums 2 among the four photoconductor drums 2 has ended.

Figure 3:
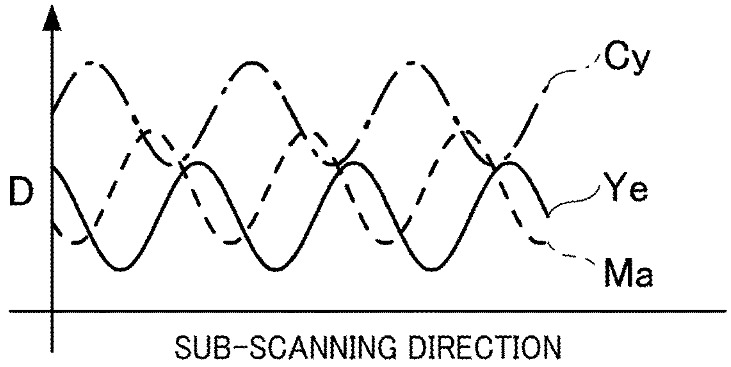
FIG. 3 is a diagram illustrating density unevenness according to a comparative example.
Figure 4:
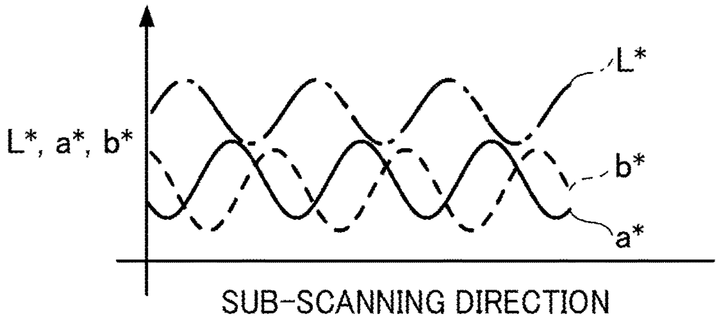
FIG. 4 is a diagram illustrating color unevenness when the density unevenness of FIG. 3 is transferred to a recording sheet.
Figure 5:
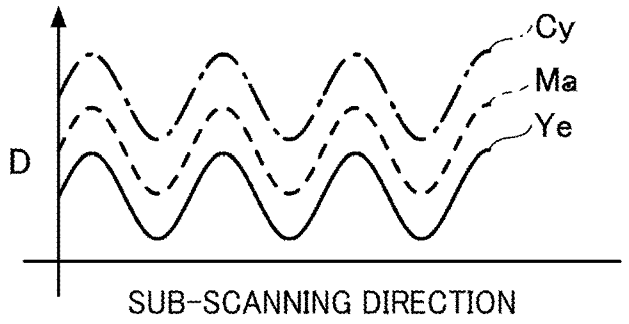
FIG. 5 is a diagram illustrating density unevenness of colors in the image forming apparatus of FIG. 1.
Figure 6:
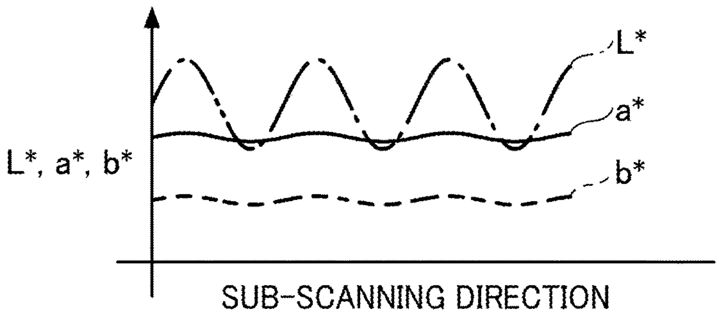
FIG. 6 is a diagram illustrating color unevenness when the density unevenness of FIG. 5 is transferred to the recording sheet.

A control method by the image forming apparatus 100 is described with reference to FIGS. 3 to 6. FIG. 3 is a diagram illustrating density unevenness according to a comparative example. FIG. 4 is a diagram illustrating color unevenness when the density unevenness of FIG. 3 is transferred to the recording sheet 20. FIG. 5 is a diagram illustrating density unevenness of each color according to the present embodiment. FIG. 6 is a diagram illustrating color unevenness when the density unevenness of FIG. 5 is transferred to the recording sheet 20. Horizontal axes in FIGS. 3 to 6 indicate a sub-scanning direction (i.e., recording-sheet conveyance direction). Vertical axes in FIGS. 3 and 5 indicate the density unevenness D. The vertical axes in FIGS. 4 and 6 indicate L*, a*, and b* that are color evaluation index.

As illustrated in FIGS. 3 and 4, when the photoconductor drums 2 of the respective colors are independently driven with respect to the density unevenness D (variations of the toner adhesion amount) of the toner image generated according to the rotation cycle of the photoconductor drum 2, the density unevenness of the image on the recording sheet 20 may be emphasized and increased when the toner images of two or more colors are superimposed.

As illustrated in FIGS. 5 and 6, in the present embodiment, a phase matching control that drives the photoconductor drums 2 is performed so that the phases of the density unevenness of the toner images formed on the photoconductor drums 2 of respective colors coincide with each other on the image on the recording sheet 20. Density unevenness of the image is reduced by the phase matching control.

Figure 7:
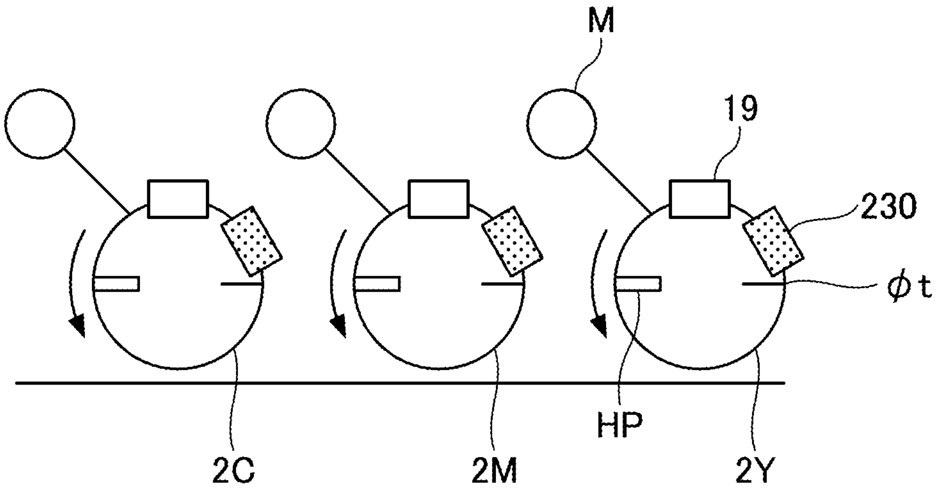
FIG. 7 is a diagram illustrating a state at the start of control by the image forming apparatus of FIG. 1.
Figure 8:
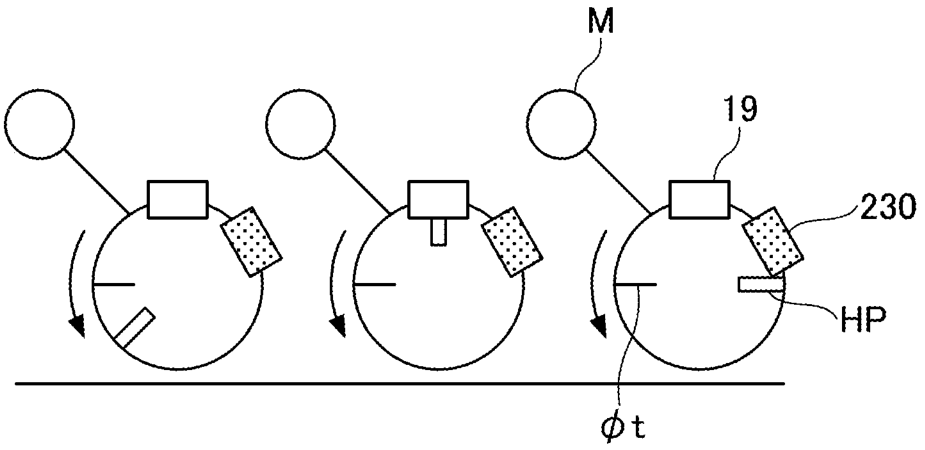
FIG. 8 is a diagram illustrating a state at the end of control by the image forming apparatus of FIG. 1.
Figure 9:
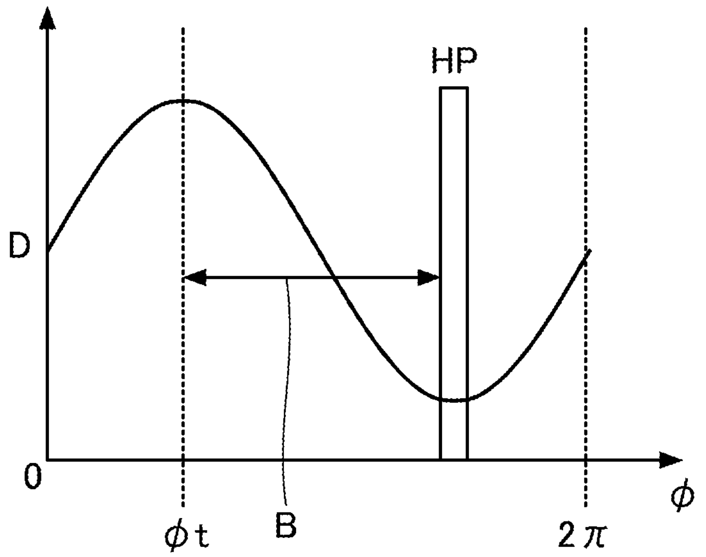
FIG. 9 is a diagram illustrating density unevenness in the image forming apparatus of FIG. 1.

FIG. 7 is a diagram illustrating a state at the start of phase matching control by the image forming apparatus 100. FIG. 8 is a diagram illustrating a state at the end of the phase matching control by the image forming apparatus 100. FIG. 9 is a diagram illustrating density unevenness in the image forming apparatus 100.

In FIGS. 7 to 9, in the phase matching control by the image forming apparatus 100, the rotation speeds of the photoconductor drums 2 are corrected so that phases φt of the density unevenness at which the density unevenness D peaks in the four photoconductor drums 2 coincide with each other on the image on the recording sheet 20 before the photoconductor drums 2 contact the intermediate transfer belt 1. As an initial phase B of the phase φpt of the density unevenness with respect to a rotation origin HP of the photoconductor drum 2, a phase separately acquired in advance is used.

In the present embodiment, the adhesion amount phase of the density unevenness of each color is detected with respect to the density unevenness generated according to the rotation cycle of the photoconductor drum 2 along the sub-scanning direction. Thus, the photoconductor drum 2 is driven to match the detected phase on the recording sheet 20.

As a result, the density unevenness of each color is canceled with respect to the superimposed image with more than secondary color.

The control according to the present embodiment includes a start-up period, a phase detection period, a calculation period, and a phase correction period. The start-up period is a period from when the rotation of the photoconductor drum 2 for each color is started until the rotation speed is stabilized at the specified rotation speed. The phase detection period is a period in which the rotation phase of each photoconductor drum 2 is detected by the photointerrupter 18 attached to the photoconductor drum 2 after the start-up has completed. In the phase detection period, the error of the rotation phase difference is reduced by equalizing the rotation speeds of the respective photoconductor drums 2.

The calculation period is a period in which the phases of the density unevenness are detected by detecting the relationship between the density unevenness generated based on the detection result and the rotation phases of the photoconductor drums 2C, 2M, and 2Y after the detection of the rotation phases of the photoconductor drums 2C, 2M, and 2Y has completed. The phase correction period is a period in which the phase of the density unevenness is adjusted by accelerating or decelerating the rotation speed of the photoconductor drum 2 using information on the phase of the detected density unevenness after the calculation period ends.

Figure 10:
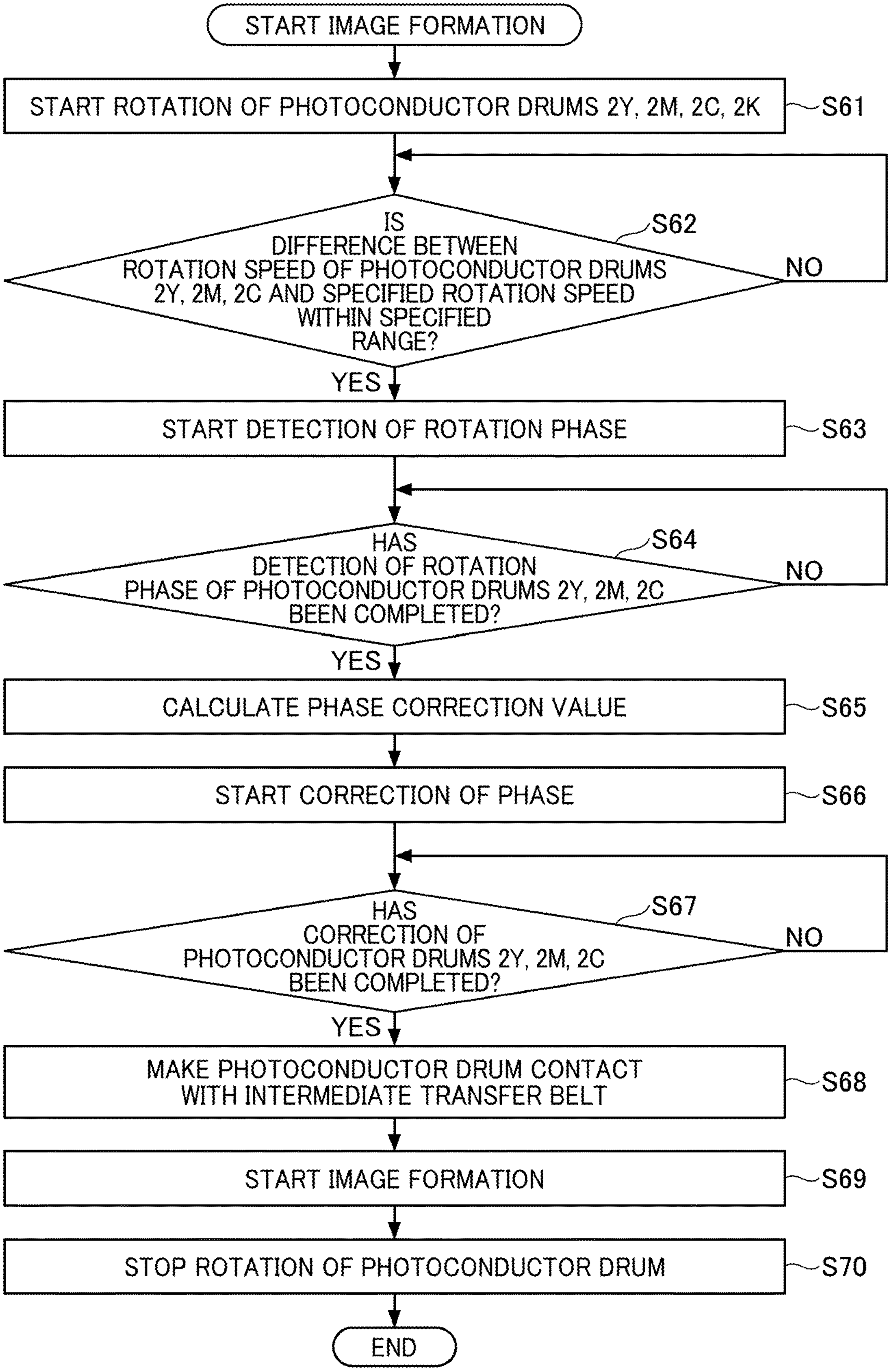
FIG. 10 is a flowchart of an operation of the image forming apparatus of FIG. 1.

FIG. 10 is a flowchart of an image forming operation of the image forming apparatus 100. In FIG. 10, a case where the image formation is performed with four colors of Y, M, C, and K and the phase matching control is performed on the photoconductor drums 2Y, 2M, and 2C is described as an example.

The image forming apparatus 100 starts an image forming operation in response to an instruction to start image formation from an external apparatus such as a personal computer (PC) or an operation input to start image formation to an operation unit disposed in the image forming apparatus 100.

First, in step S61 of FIG. 10, the image forming apparatus 100 causes the control unit 37 to start rotation of the photoconductor drums 2Y, 2M, 2C, and 2K.

Subsequently, in step S62 of FIG. 10, the image forming apparatus 100 causes the control unit 37 to determine whether the difference between the rotation speed of the photoconductor drums 2Y, 2M, and 2C and the specified rotation speed is within a specified range. The specified rotation speed is, for example, a specified target rotation speed.

In a case where it is determined in step S62 that the difference is not within the specified range (No in step S62 of FIG. 10), the image forming apparatus 100 causes the control unit 37 to perform the operation of step S62 again. On the other hand, in Step S63 of FIG. 10, in a case where it is determined that the difference is within the specified range (Yes in step S62 of FIG. 10), the image forming apparatus 100 causes the detection unit 210 to start detection of the rotation phases of the photoconductor drums 2Y, 2M, and 2C.

Subsequently, in step S64 of FIG. 10, the image forming apparatus 100 causes the detection unit 210 to determine whether the detection of the rotation phases of the photoconductor drums 2Y, 2M, and 2C has completed.

In a case where it is determined in step S64 that the processing has not completed (No in step S64 of FIG. 10), the image forming apparatus 100 causes the control unit 37 to perform the operation of step S64 again. On the other hand, in a case where it is determined in step S64 that the processing has completed (Yes in step S64 of FIG. 10), the image forming apparatus 100 causes the calculation unit 211 to calculate phase correction values of the photoconductor drums 2Y, 2M, and 2C in step S65.

Subsequently, in step S66 of FIG. 10, the image forming apparatus 100 causes the correction unit 371 to correct the rotation phases of the photoconductor drums 2Y, 2M, and 2C after completion of the calculation by the calculation unit 211.

Subsequently, in step S67 of FIG. 10, the image forming apparatus 100 causes the control unit 37 to determine whether the correction of the rotation phases of the photoconductor drums 2Y, 2M, and 2C has completed.

In a case where it is determined in step S67 that the processing has not completed (No in step S67 of FIG. 10), the image forming apparatus 100 causes the control unit 37 to perform the operation of step S67 again. On the other hand, in a case where it is determined that the processing has completed (Yes in step S67 of FIG. 10), the image forming apparatus 100 causes the control unit 37 to bring each of the photoconductor drums 2 into contact with the intermediate transfer belt 1 in step S68.

Subsequently, in step S69 of FIG. 10, the image forming apparatus 100 causes the control unit 37 to start image formation on the recording sheet 20.

Subsequently, in step S70 of FIG. 10, after the end of the image formation, the image forming apparatus 100 causes the control unit 37 to stop the photoconductor drum 2. Thus, the operation ends.

As described above, the image forming apparatus 100 can form an image on the recording sheet 20 while performing phase matching control. Note that the number of colors for which image formation is performed is not particularly limited as long as two or more colors are used. An order in which detection or correction is performed on each photoconductor drum 2 can be appropriately changed. In the description of FIG. 10, a description of control of components other than the photoconductor drum 2 is omitted.

Figure 11:
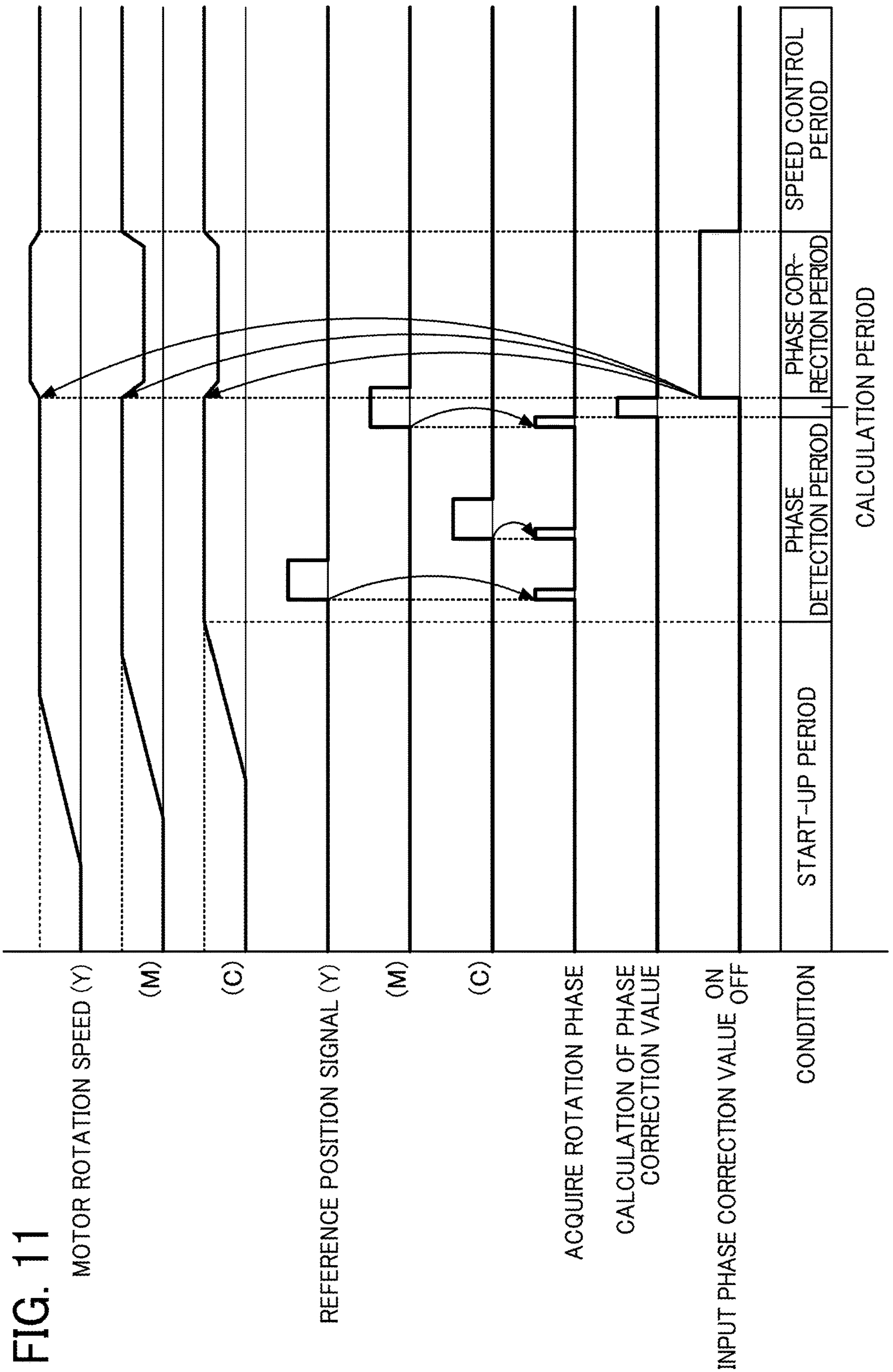
FIG. 11 is a timing chart illustrating an operation of the image forming apparatus of FIG. 1.

FIG. 11 is a timing chart illustrating an operation of the image forming apparatus 100. As illustrated in FIG. 11, the period after the start of rotation of each photoconductor drum 2 transitions in the order of a start-up period, a phase detection period, a calculation period, a phase correction period, and a speed control period.

In the start-up period, the control unit 37 starts up the motor M in the photoconductor drum 2 on which the phase matching control is performed, that is, performs an operation of causing the photoconductor drum 2 to converge to the specified rotation speed. In the phase detection period, the detection unit 210 detects the rotation phase of the photoconductor drum 2 based on a rising edge of the rotation origin detection signal of each photoconductor drum 2 by the photointerrupter 18.

In the calculation period, the calculation unit 211 calculates the phase correction value from the relationship between the rotation phase difference and the phase of the density unevenness in each photoconductor drum 2. In the phase correction period, the correction unit 371 outputs the phase correction value calculated in the calculation period to the motor M of the corresponding photoconductor drum 2 and corrects the rotation phase of the photoconductor drum 2. In the speed control period, the control unit 37 controls the rotation speed of the motor M in the photoconductor drum 2. Since the rotation speed is changed during the phase correction period, the contact of the photoconductor drum 2 with the intermediate transfer belt 1 is performed when the rotation speed of the photoconductor drum 2 transitions to a stable speed control period after the end of the phase correction period.

Figure 12:
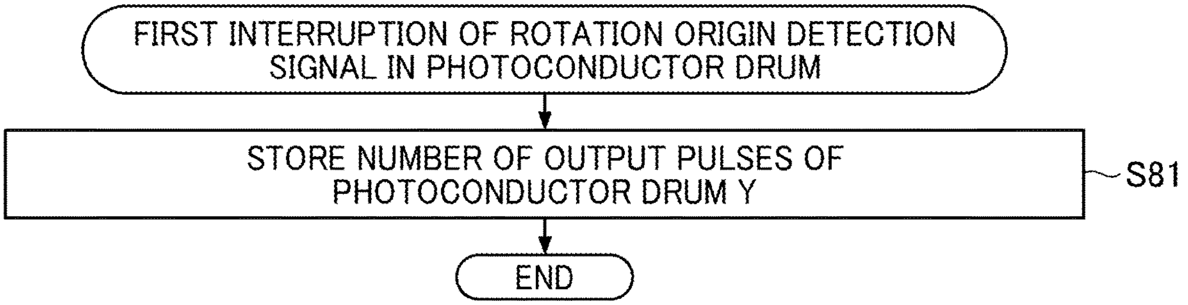
FIG. 12 is a flowchart of a detection operation of rotation phase of a photoconductor drum of the image forming apparatus of FIG. 1.

FIG. 12 is a flowchart of the detection operation of rotation phase of the photoconductor drum 2 by the image forming apparatus 100. In the phase detection period, the image forming apparatus 100 starts the detection operation of rotation phase of the photoconductor drum 2 in response to the first interruption of the signal that the photointerrupter 18 has detected the rotation origin HP of the photoconductor drum 2.

In step S81 of FIG. 12, the image forming apparatus 100 stores the number of pulses output from the rotary encoder 230 in the photoconductor drum 2Y, which is a specified photoconductor drum, in a volatile memory disposed in the control unit 37 and detects the rotation phase differences of the respective photoconductor drums 2. An operation of storing the number of pulses output from the rotary encoder 230 in the photoconductor drum 2Y is exemplified. The number of pulses output from the rotary encoder 230 in the photoconductor drum 2 of another color may be stored.

Figure 13:
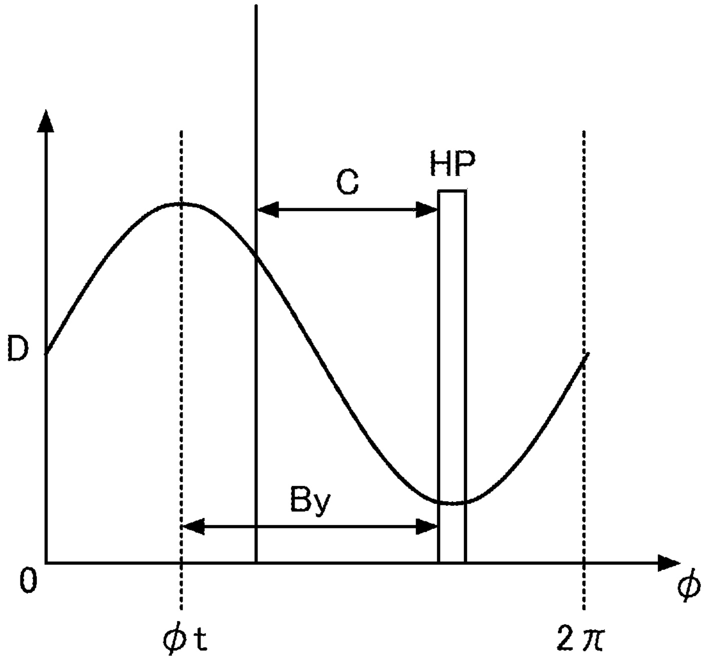
FIG. 13 is a first diagram illustrating a detection operation of the density-unevenness phase difference of the image forming apparatus of FIG. 1.
Figure 14:
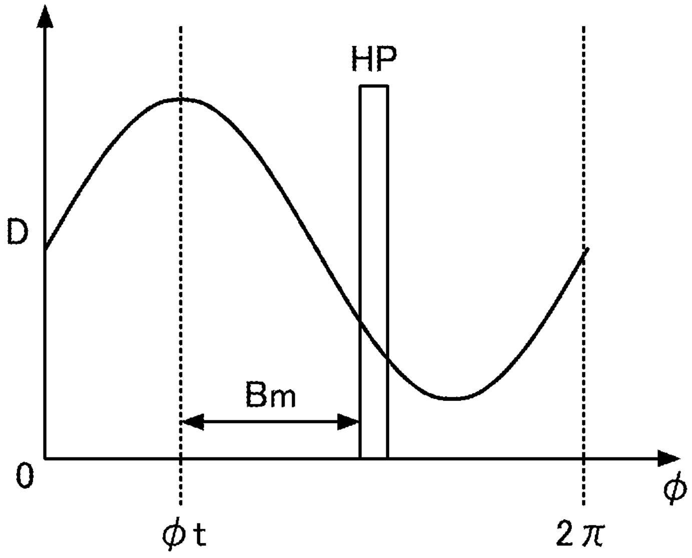
FIG. 14 is a second diagram illustrating the detection operation of the density-unevenness phase difference of the image forming apparatus of FIG. 1.

FIG. 13 is a first diagram illustrating a detection operation of the density-unevenness phase difference by the image forming apparatus 100. FIG. 13 illustrates the phase of density unevenness of the photoconductor drum 2Y. FIG. 14 is a second diagram illustrating the detection operation of the density-unevenness phase difference by the image forming apparatus 100. FIG. 14 illustrates the phase of density unevenness of the photoconductor drum 2M.

In the calculation period, the density-unevenness phase difference between the different photoconductor drums 2 are obtained by calculating from the rotation phase differences between the photoconductor drum 2Y and the photoconductor drum 2M detected in the phase detection period, and the relationship between the rotation origins of the photoconductor drums 2 and the peaks of the density unevenness phases acquired in advance.

In the examples illustrated in FIGS. 13 and 14, it is assumed that the phases of the photoconductor drum 2Y and the photoconductor drum 2M are matched, and the number of pulses output from the rotary encoder 230 of the photoconductor drum 2Y is stored, for example, in the volatile memory during the phase detection period.

A density-unevenness phase difference A between the photoconductor drum 2Y and the photoconductor drum 2M is calculated from the following expression $A=C-(By-Bm)$. Here, C represents a difference in rotation origin detection timing between the photoconductor drum 2Y and the photoconductor drum 2M, and By and Bm represent initial phases.

The correction unit 371 can assign phase correction values that cancel the density-unevenness phase difference to the photoconductor drum 2Y and the photoconductor drum 2M based on the calculated phase difference A of the density unevenness.

As described above, the control device 200 includes the detection unit 210 that detects the density unevenness of the toner image generated according to the rotation cycle of the photoconductor drum 2 based on the rotation phase of each of the plurality of rotatable photoconductor drums 2 (image bearers) and the density of the toner image formed on the photoconductor drum 2. The control device 200 includes the control unit 37 that controls the rotation phase of the photoconductor drum 2 based on the detection result by the detection unit 210 and the rotation speed of each of the plurality of photoconductor drums 2.

The control unit 37 performs control so that at least two photoconductor drums 2 among the plurality of photoconductor drums 2 have the specified rotation speed when the plurality of photoconductor drums 2 start to rotate. The detection unit 210 starts the operation of detecting the rotation phase when the difference between the rotation speed of at least two photoconductor drums 2 and the specified rotation speed is within the specified range. As a result, the control device 200 can rotate the photoconductor drums 2 such that the phases of the density unevenness in the plurality of photoconductor drums 2 coincide with each other on the image on the recording sheet 20. Thus, the rotation phases of the photoconductor drums 2 can be accurately controlled. The image forming apparatus 100 can reduce density unevenness for each color and can reduce color unevenness of the image formed on the recording sheet 20.

For example, in the present embodiment, the detection unit 210 starts the calculation for calculating the rotation phase when the operation that detects the rotation phases of at least two photoconductor drums 2 has completed. The control unit 37 starts the correction of the density unevenness when the calculation for calculating the rotation phases of at least two photoconductor drums 2 has completed. The control unit 37 starts the control of the rotation speeds of the photoconductor drums 2 when the operation for correcting the density unevenness of at least two photoconductor drums 2 has completed. As a result, the control device 200 can accurately control the rotation phases of the photoconductor drums 2.

In the present embodiment, the detection unit 210 further detects the rotation origin HP disposed on the photoconductor drum 2, and the rotation origin HP rotates together with the rotation of the photoconductor drum 2. As a result, the control device 200 can detect the initial phase of the photoconductor drum 2 with an inexpensive configuration.

In the present embodiment, the detection unit 210 detects the rotation phase difference between at least two photoconductor drums 2. The control unit 37 corrects the density unevenness by matching the phases of the density unevenness in at least two photoconductor drums 2 based on the rotation phase difference and the phase of the density unevenness. The control unit 37 controls the rotating speed of the photoconductor drums 2 so that the phases of the density unevenness in at least two photoconductor drums 2 are matched. As a result, the control device 200 can accurately control the rotation phases of the photoconductor drums 2.

First Modification

Figure 15:
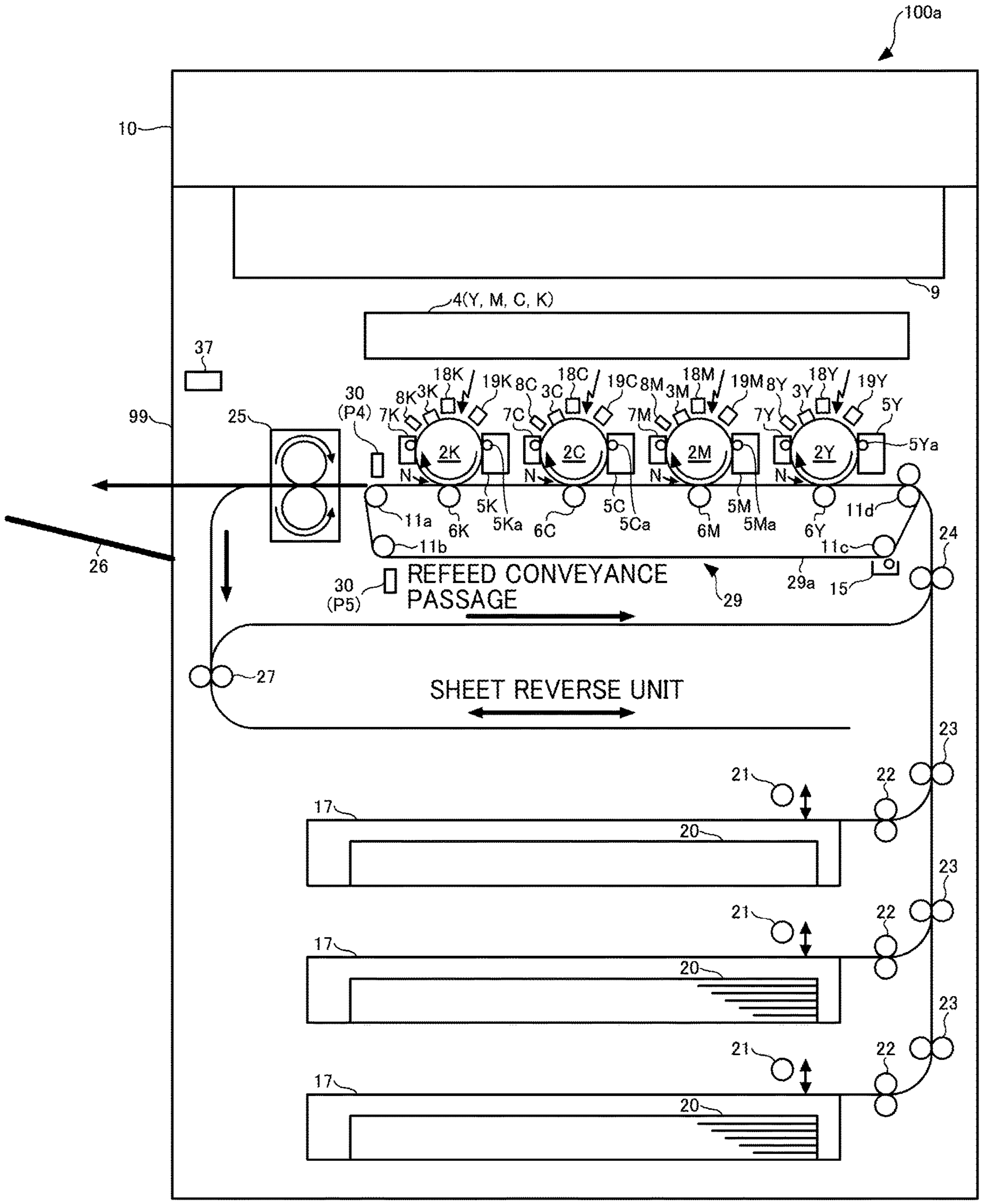
FIG. 15 is a diagram illustrating an overall configuration of an image forming apparatus according to a first modification of the present disclosure.

FIG. 15 is a diagram illustrating an overall configuration of an image forming apparatus 100*a* according to a first modification. In FIG. 15, the same members and devices as those of the image forming apparatus 100 of FIG. 1 are denoted by the same reference numerals, and redundant description thereof is appropriately omitted.

The image forming apparatus 100*a* is the quadruple-tandem-type direct-transfer-type full-color machine and includes a transfer unit 29 that transfers toner images formed on the photoconductor drums 2Y, 2M, 2C, and 2K to the recording sheet 20 vertically below the four sets of the image forming stations. The transfer unit 29 includes an endless transfer conveying belt 29*a* rotatably supported from a drive roller 11*a* to a driven roller 11*d* as a plurality of supporters. The transfer conveying belt 29*a* is wound around the drive roller 11*a*, a driven roller 11*b*, and the driven roller 11*d*, and bears and conveys the recording sheet 20 to pass through the transfer position N of each image forming station while being rotationally driven in the counterclockwise direction in FIG. 15 at a specified timing. The image forming apparatus 100*a* includes the primary transfer rollers 6Y, 6M, 6C, and 6K for applying transfer charges at transfer positions N to transfer toner images on the respective photoconductor drums 2Y, 2M, 2C, and 2K to the recording sheet 20 inside the transfer conveying belt 29*a*.

The image forming apparatus 100*a* performs the following operation when, for example, a full-color mode that is superimposed with four color is selected by the operation unit. That is, the image forming apparatus 100*a* performs an image forming process that forms the toner images of the respective colors on the photoconductor drums 2Y, 2M, 2C, and 2K of the image forming stations of the respective colors in synchronization with the conveyance of the recording sheet 20.

On the other hand, the recording sheet 20 is fed from the sheet trays 17, sent out at the specified timing by the registration roller pair 24, and borne on the transfer conveying belt 29*a*. The image forming apparatus 100*a* conveys the recording sheet 20 to pass through the transfer position N of each image forming station. The image forming apparatus 100 transfers the toner images of the respective colors to form a four color superimposed color image onto the recording sheet 20. The fixing unit 25 fixes the toner images on the recording sheet 20. Thus, the image forming apparatus 100 ejects the recording sheet 20 onto the output tray 26.

The image forming apparatus 100*a* includes the toner-image detection sensor 30. The toner-image detection sensor 30 is disposed at a pre-fixing position P4 which is a position opposite a portion where the transfer conveying belt 29*a* is wound around the drive roller 11*a* most downstream from the transfer unit 29 in the recording-sheet conveyance direction. The present embodiment can also be applied to the image forming apparatus 100*a* described above.

Second Embodiment

An image forming apparatus 100*b* according to a second embodiment is described.

The same components as the components described in the first embodiment are denoted by the same reference numerals, and redundant description is omitted as appropriate.

When the control device disposed in the image forming apparatus includes an abnormality detection unit that detects an abnormality in the rotation speed of the photoconductor drum 2, the abnormality detection unit may erroneously detect a change in the rotation speed of the photoconductor drum 2 during the phase matching control. In the present embodiment, the abnormality in the rotation speed of the photoconductor drum 2 can be detected while preventing erroneous detection by the abnormality detection unit.

Figure 16:
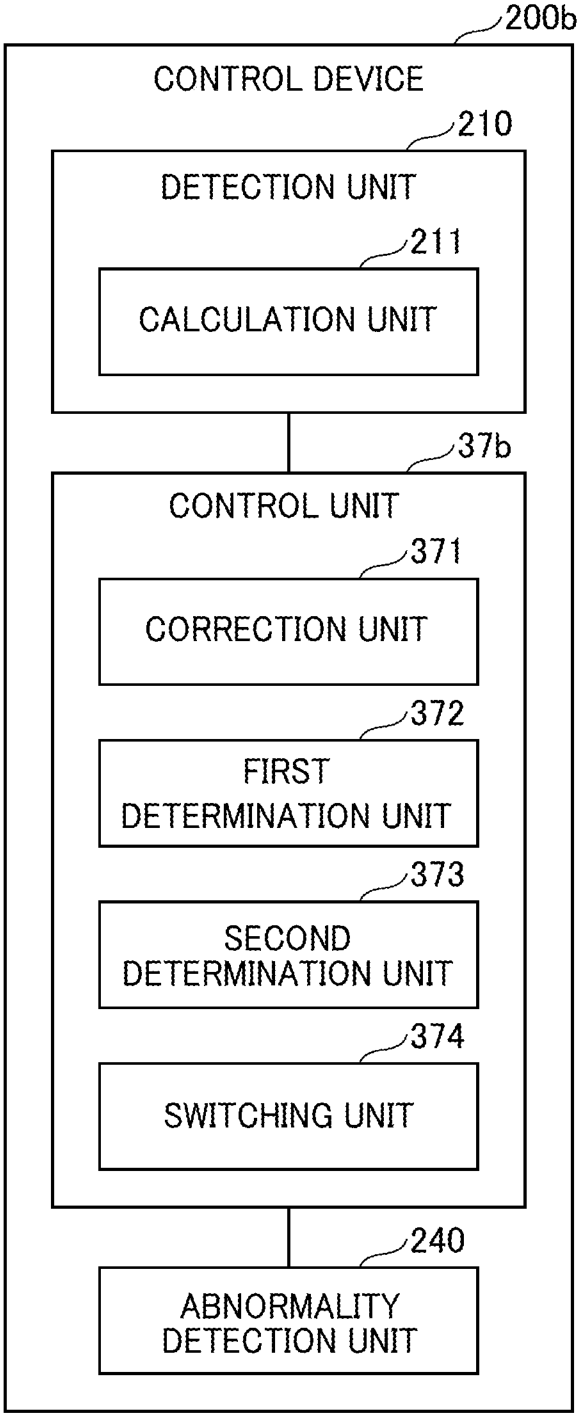
FIG. 16 is a block diagram illustrating a functional configuration of a control device of an image forming apparatus according to a second embodiment of the present disclosure.

FIG. 16 is a block diagram illustrating a functional configuration of a control device 200*b* of the image forming apparatus 100*b*. The hardware configuration of the control device 200*b* in FIG. 16 is substantially the same as the hardware configuration in above-described configuration illustrated in FIG. 2B. The description is given with reference to above-described FIG. 2A as appropriate.

As illustrated in FIG. 16, the control device 200*b* includes a control unit 37*b* and an abnormality detection unit 240. The control unit 37*b* includes a correction unit 371, a first determination unit 372, a second determination unit 373, and a switching unit 374.

The first determination unit 372 determines whether the difference between the rotation speed of the photoconductor drum 2 and the specified rotation speed is within the specified range. The first determination unit 372 can determine that the difference between the rotation speed of the photoconductor drum 2 and the specified rotation speed is not within the specified range when the rotation speed of the photoconductor drum 2 deviates from the specified range from the minimum speed to the maximum speed for a specified time.

When the first determination unit 372 determines that the difference is not within the specified range, the second determination unit 373 determines whether the detection by the abnormality detection unit 240 is to be enabled. In the present embodiment, the second determination unit 373 can output a determination result of enabling the detection by the abnormality detection unit 240 in the position detection period, the position correction value calculation period, and the speed control period and disabling the detection by the abnormality detection unit 240 in the start-up period and the position correction period.

The switching unit 374 switches between enabling and disabling of the detection by the abnormality detection unit 240. Based on the determination result by the second determination unit, the switching unit 374 can switch between enabling and disabling of the detection by the abnormality detection unit 240.

The abnormality detection unit 240 has a function of detecting an abnormality in the rotation speed of the photoconductor drum 2. A method of abnormality detection is not particularly limited. For example, the abnormality detection unit 240 can detect the abnormality based on the output of the rotary encoder 230 disposed in the motor M of the photoconductor drum 2.

Figure 17:
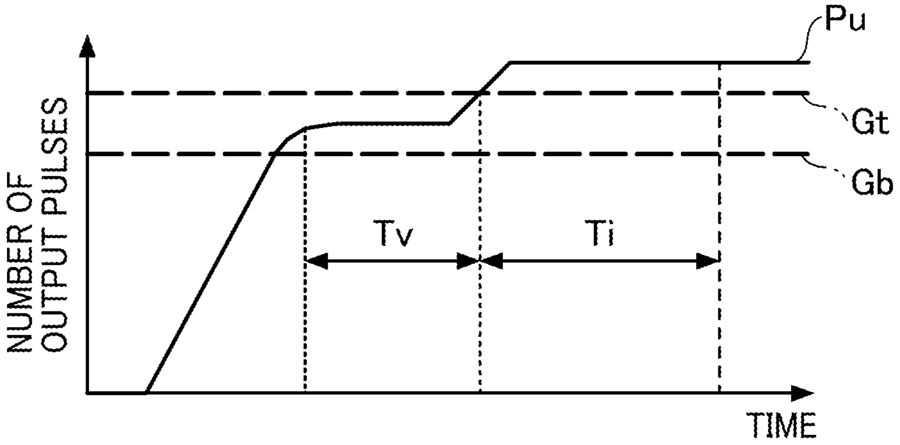
FIG. 17 is a diagram illustrating an operation of a second determination unit according to the second embodiment of the present disclosure.

FIG. 17 is a diagram illustrating an operation of the second determination unit 373. In FIG. 17, the horizontal axis represents time, and the vertical axis represents the number of output pulses of the rotary encoder 230.

In order to prevent the photoconductor drum 2 from rotating at an unexpected speed, the abnormality detection unit 240 can determine that the rotation speed is abnormal when the number of output pulses of the rotary encoder 230 deviates from a specified minimum speed and maximum speed for the specified time.

In FIG. 17, a graph Pu indicates changes in the number of output pulses of the rotary encoder 230. The maximum speed Gt indicates the maximum rotation speed of the motor M, and the minimum speed Gb indicates the minimum rotation speed of the motor M. A period Tv indicates a period in which the abnormality detection is enabled, and the specified time Ti indicates the specified time for determining the abnormality of the rotation speed.

Figures 18, 18A:
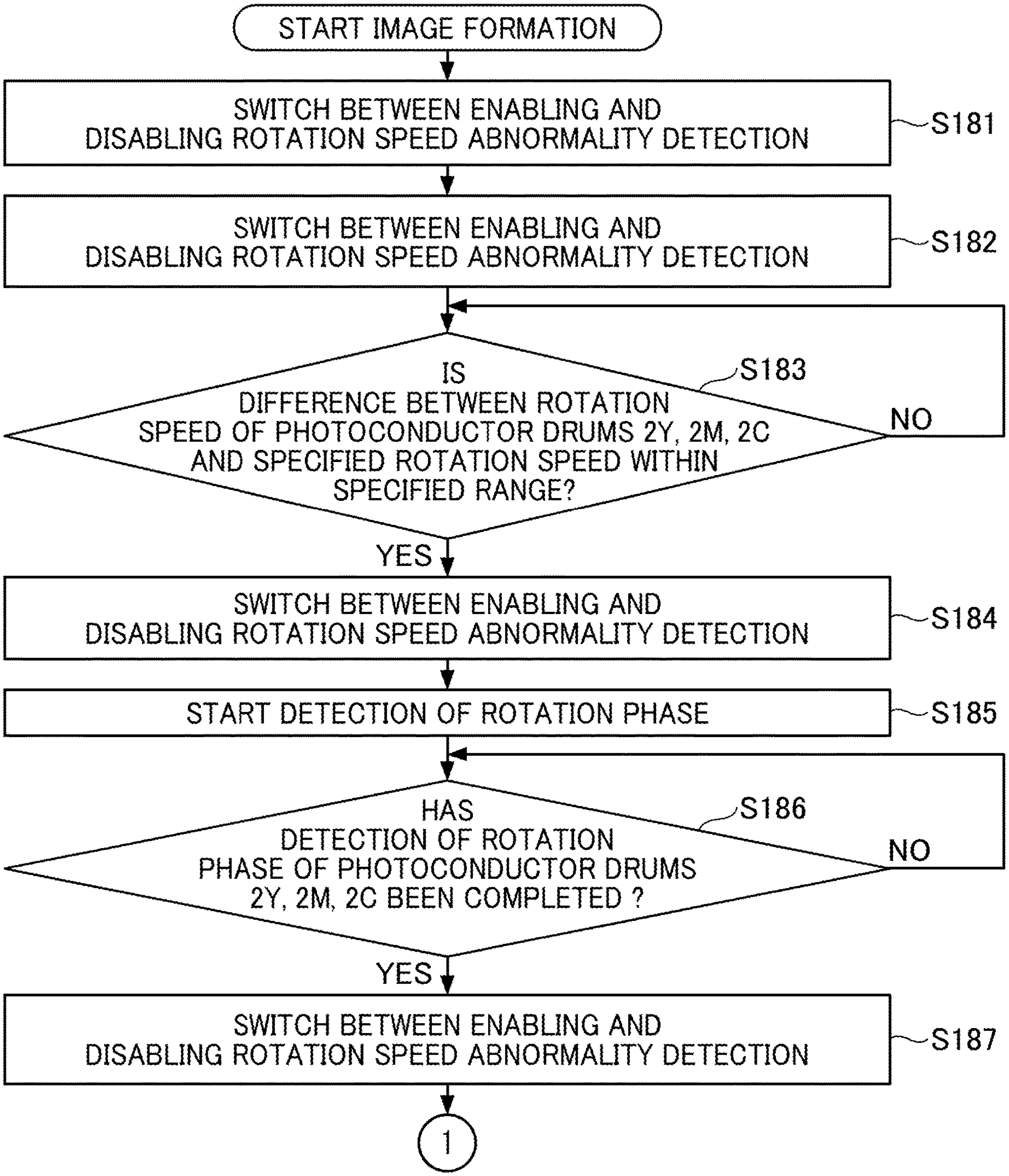
FIG. 18 including
FIGS. 18A and 18B is a flowchart of an operation of the image forming apparatus according to the second embodiment of the present disclosure.
Figure 18B:
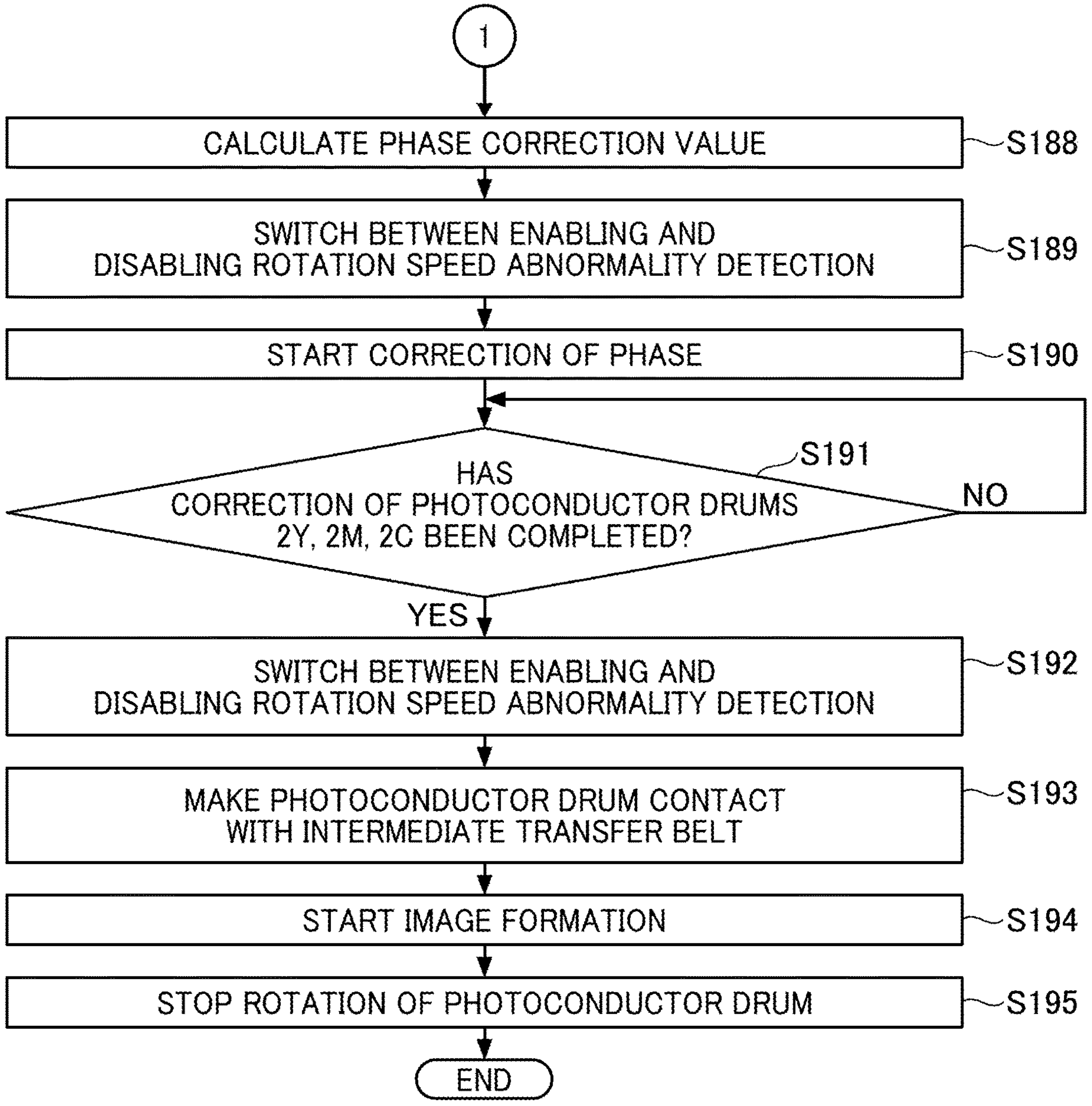

FIG. 18 including FIGS. 18A and 18B is a flowchart of the operation of the image forming apparatus 100*b*. In FIG. 18, a case where an image formation is performed with four colors of Y, M, C, and K, and phase matching control is performed on the photoconductor drums 2Y, 2M, and 2C is described as an example. Description of the components or portions described with reference to FIG. 10 is omitted as appropriate.

The image forming apparatus 100*b* starts an image forming operation in response to an instruction to start image formation from an external apparatus such as a personal computer or an operation input to start image formation to an operation unit disposed in the image forming apparatus 100*b*.

First, in step S181 of FIG. 18, the image forming apparatus 100*b* causes the control unit 37*b* to switch between enabling and disabling of the detection by the abnormality detection unit 240. This switching operation is described separately with reference to FIG. 19. The same applies to steps S184, S187, S189, and S192 in subsequent operations.

Subsequently, in step S182 of FIG. 18, the image forming apparatus 100 causes the control unit 37*b* to start rotation of the photoconductor drums 2Y, 2M, 2C, and 2K.

Subsequently, in step S183 of FIG. 18, the image forming apparatus 100*b* causes the first determination unit 372 to determine whether the difference between the rotation speed of the photoconductor drums 2Y, 2M, and 2C and the specified rotation speed is within the specified range.

In a case where it is determined in step S183 that the difference is not within the specified range (No in step S183 of FIG. 18), the image forming apparatus 100*b* performs the operation of step S183 again. On the other hand, in a case where it is determined that the difference is within the specified range (Yes in step S183 of FIG. 18), the image forming apparatus 100*b* causes the control unit 37*b* to switch between enabling and disabling of the detection by the abnormality detection unit 240 in step S184.

Subsequently, in step S185 of FIG. 18, the image forming apparatus 100*b* causes the detection unit 210 to start the detection of the rotation phases of the photoconductor drums 2Y, 2M, and 2C.

Subsequently, in step S186 of FIG. 18, the image forming apparatus 100*b* causes the detection unit 210 to determine whether the detection of the rotation phases of the photoconductor drums 2Y, 2M, and 2C has completed.

In a case where it is determined in step S186 that the processing has not completed (NO in step S186 of FIG. 18), the image forming apparatus 100*b* performs the operation of step S186 again. On the other hand, in a case where it is determined that the detection has completed (Yes in step S186 of FIG. 18), the image forming apparatus 100*b* causes the control unit 37*b* to switch between enabling and disabling of the detection by the abnormality detection unit 240 in step S187.

Subsequently, in step S188 of FIG. 18, the image forming apparatus 100*b* causes the calculation unit 211 to calculate the phase correction values of the photoconductor drums 2Y, 2M, and 2C.

Subsequently, in step S189 of FIG. 18, the image forming apparatus 100*b* causes the control unit 37*b* to switch between enabling and disabling of the detection by the abnormality detection unit 240.

Subsequently, in step S190 of FIG. 18, the image forming apparatus 100*b* causes the correction unit 371 to correct the rotation phases of the photoconductor drums 2Y, 2M, and 2C after completion of the calculation by the calculation unit 211.

Subsequently, in step S191 of FIG. 18, the image forming apparatus 100*b* causes the control unit 37*b* to determine whether the correction of the rotation phases of the photoconductor drums 2Y, 2M, and 2C has completed.

In a case where it is determined in step S191 that the processing has not completed (NO in step S191 of FIG. 18), the image forming apparatus 100*b* performs the operation of step S191 again. On the other hand, in a case where it is determined that the detection has completed (Yes in step S191 of FIG. 18), the image forming apparatus 100*b* causes the control unit 37*b* to switch between enabling and disabling of the detection by the abnormality detection unit 240 in step S192.

Subsequently, in step S193 of FIG. 18, the image forming apparatus 100*b* causes the control unit 37*b* to bring each of the photoconductor drums 2 into contact with the intermediate transfer belt 1.

Subsequently, in step S194 of FIG. 18, the image forming apparatus 100*b* starts image formation on a recording sheet.

Subsequently, in step S195 of FIG. 18, the image forming apparatus 100*b* stops the photoconductor drum 2 after the end of the image formation. Thus, the operation ends.

In this way, the image forming apparatus 100*b* can form an image on the recording sheet while performing the phase matching control.

Figure 19:
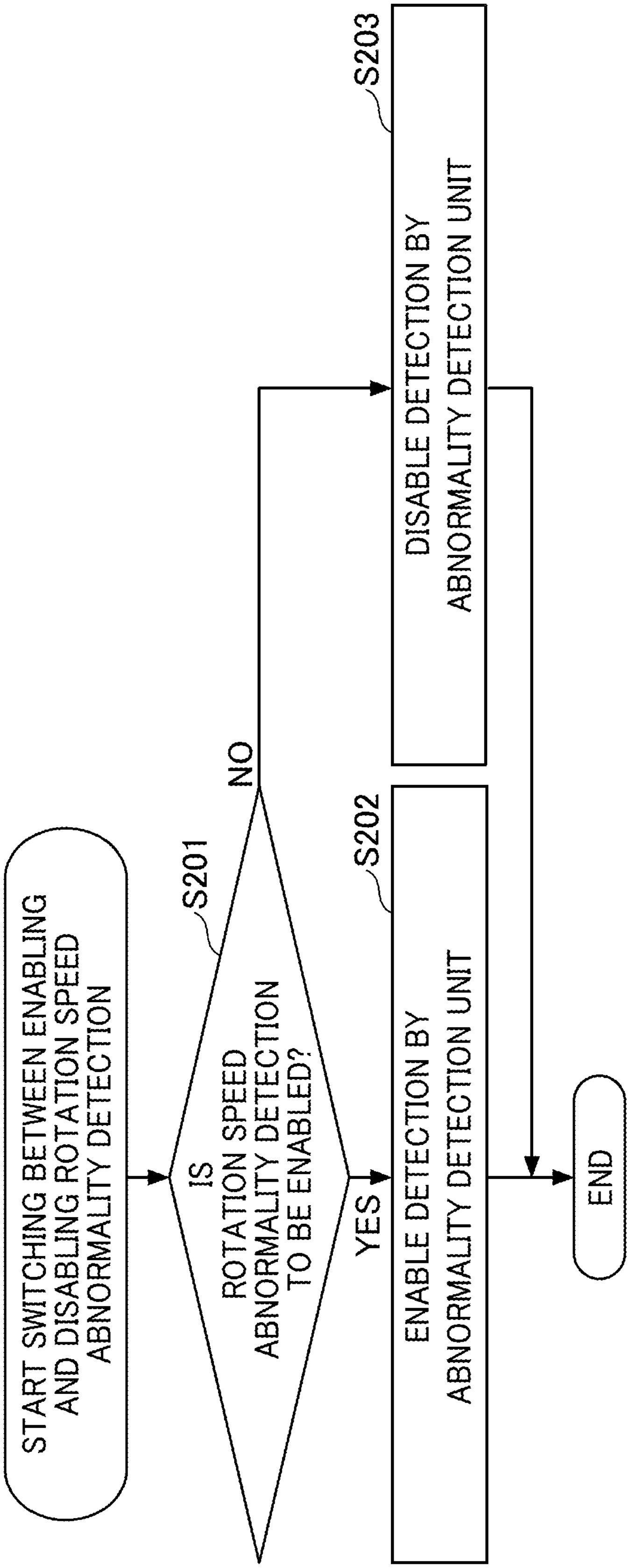
FIG. 19 is a diagram illustrating a switching operation between enabling and disabling of an abnormality detection unit.

FIG. 19 is a flowchart of an operation of switching between enabling and disabling of the rotation speed abnormality detection. The image forming apparatus 100*b* starts the switching operation of enabling or disabling the rotation speed abnormality detection at the beginning of each of the start-up period, the phase detection period, the calculation period, the phase correction period, and the speed control period.

First, in step S201 of FIG. 19, the image forming apparatus 100*b* causes the second determination unit 373 to determine whether the detection by the abnormality detection unit 240 is to be enabled. In this determination, the second determination unit 373 determines that the detection by the abnormality detection unit 240 is to be enabled in the position detection period, the position correction value calculation period, and the speed control period. Then, the second determination unit 373 determines that the detection by the abnormality detection unit 240 is to be disabled in the start-up period and the position correction period. Thus, the determination result is output.

In a case where it is determined in step S201 that the abnormality detection is to be enabled (Yes in step S201 of FIG. 19), the image forming apparatus 100*b* causes the switching unit 374 to enable the detection by the abnormality detection unit 240 in step S202. On the other hand, in a case where it is determined that the abnormality detection is not to be enabled (No in step S201 of FIG. 19), the image forming apparatus 100*b* causes the switching unit 374 to disable the detection by the abnormality detection unit 240 in step S203.

In this way, the image forming apparatus 100*b* can switch between enabling and disabling of the detection by the abnormality detection unit 240.

As described above, the control device 200*b* includes the abnormality detection unit 240, the first determination unit 372, the second determination unit 373, and the switching unit 374. The abnormality detection unit 240 detects the abnormality in the rotation speed of the photoconductor drum 2. The first determination unit 372 determines whether the difference between the rotation speed of the photoconductor drum 2 and the specified rotation speed is within the specified range in addition to the configuration of the control device 200 according to the first embodiment. Further, when the first determination unit 372 determines that the difference between the rotation speed of the photoconductor drum 2 and the specified rotation speed is not within the specified range, the second determination unit 373 determines whether the detection by the abnormality detection unit 240 is to be enabled. The switching unit 374 switches between enabling and disabling of the detection by the abnormality detection unit 240.

For example, when the rotation speed of the photoconductor drum 2 is out of the specified range from the predetermined maximum speed to the minimum speed for the specified time, the first determination unit 372 determines that the difference between the rotation speed of the photoconductor drum 2 and the specified rotation speed is not within the specified range.

For example, the second determination unit 373 outputs a determination result of enabling the detection by the abnormality detection unit 240 in the position detection period, the position correction value calculation period, and the speed control period and disabling the detection by the abnormality detection unit 240 in the start-up period and the position correction period is output.

For example, the switching unit 374 switches between enabling and disabling of the detection by the abnormality detection unit 240 based on the determination result by the second determination unit 373.

Such a configuration can disable the detection by the abnormality detection unit 240 in the period in which the rotation speed of the photoconductor drum 2 changes during the phase matching control, thus allowing an erroneous detection by the abnormality detection unit 240 to be prevented. Such a configuration can also enable the detection by the abnormality detection unit 240 in the period in which the rotation speed of the photoconductor drum 2 does not change during the phase matching control. As a result, the abnormality in the rotation speed of the photoconductor drum 2 can be detected while preventing the erroneous detection by the abnormality detection unit 240. Advantageous effects other than the effects described above are similar to the effects of the first embodiment.

Second Modification

With reference to FIGS. 20 to 30, a description is given of a case where an image composed of two colors of C and M is printed by the image forming apparatus of FIG. 1.

Figure 20:
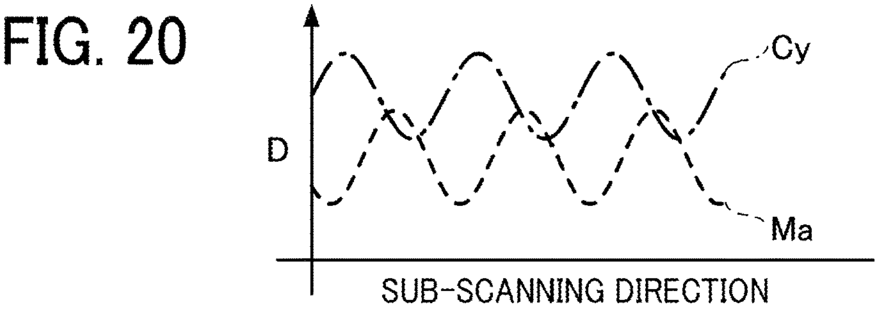
FIG. 20 is a diagram illustrating density unevenness according to a comparative example of a second modification of the present disclosure.
Figure 21:
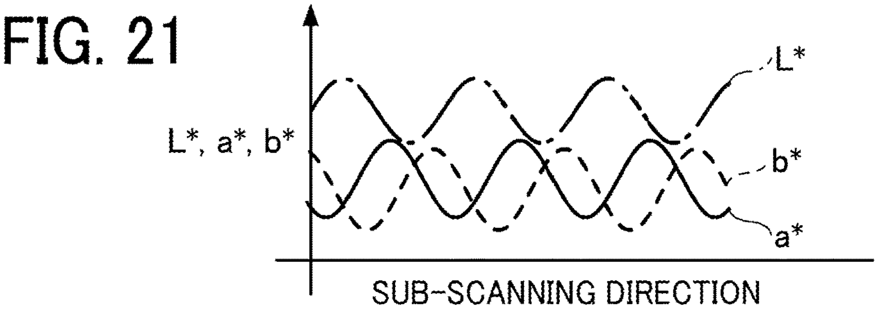
FIG. 21 is a diagram illustrating color unevenness when the density unevenness in FIG. 20 is transferred to a recording sheet.
Figure 22:
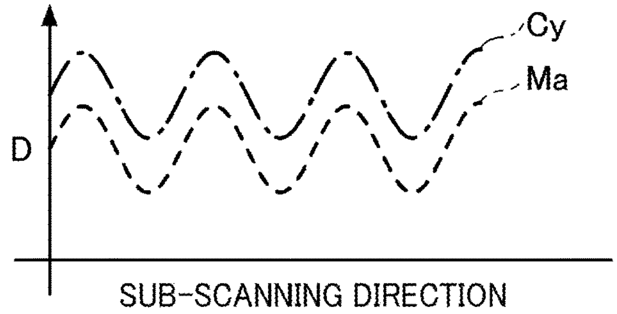
FIG. 22 is a diagram illustrating density unevenness of colors in an image forming apparatus according to the second modification of the present disclosure.
Figure 23:
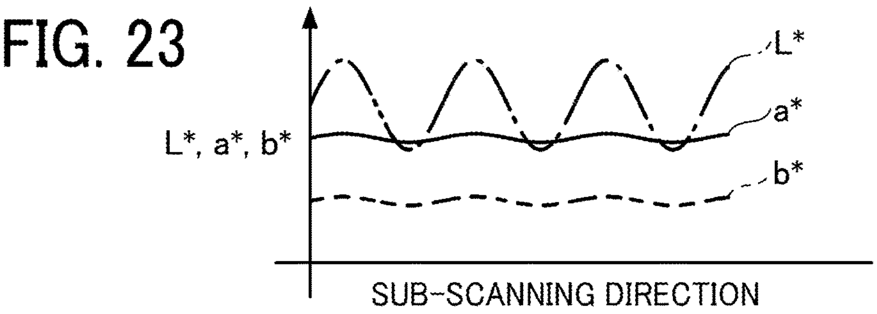
FIG. 23 is a diagram illustrating color unevenness when the density unevenness in FIG. 22 is transferred to the recording sheet.
Figure 24:
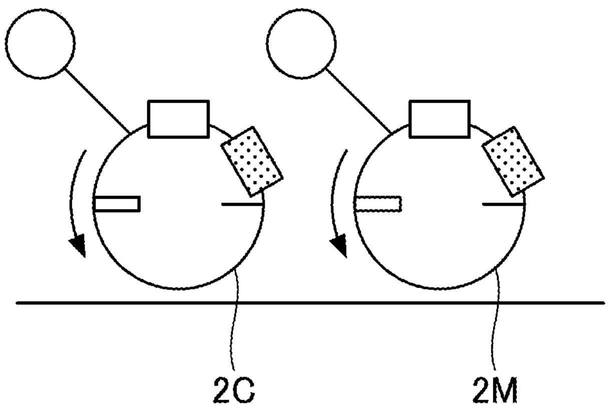
FIG. 24 is a diagram illustrating a state at the start of control by the image forming apparatus according to the second modification of the present disclosure.
Figure 25:
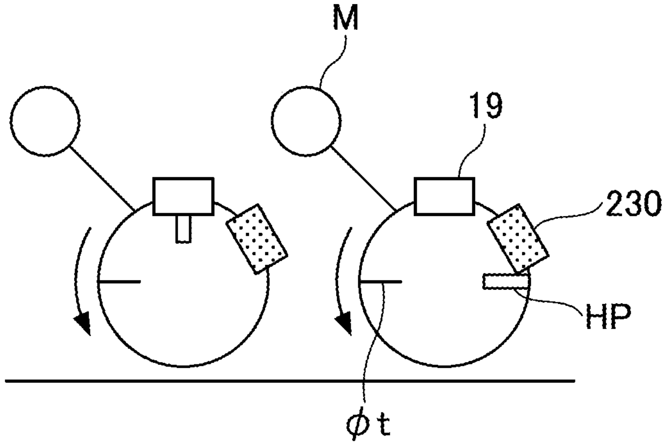
FIG. 25 is a diagram illustrating a state at the end of control by the image forming apparatus according to the second modification of the present disclosure.
Figure 26:
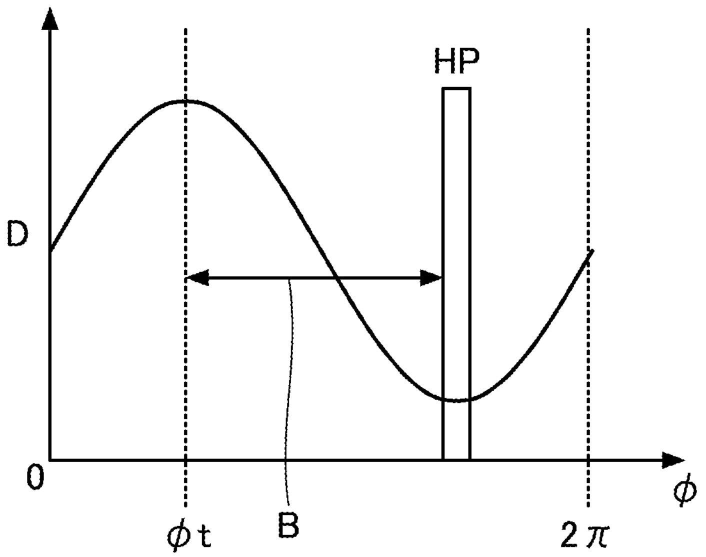
FIG. 26 is a diagram illustrating the density unevenness in the image forming apparatus according to the second modification of the present disclosure.
Figure 27:
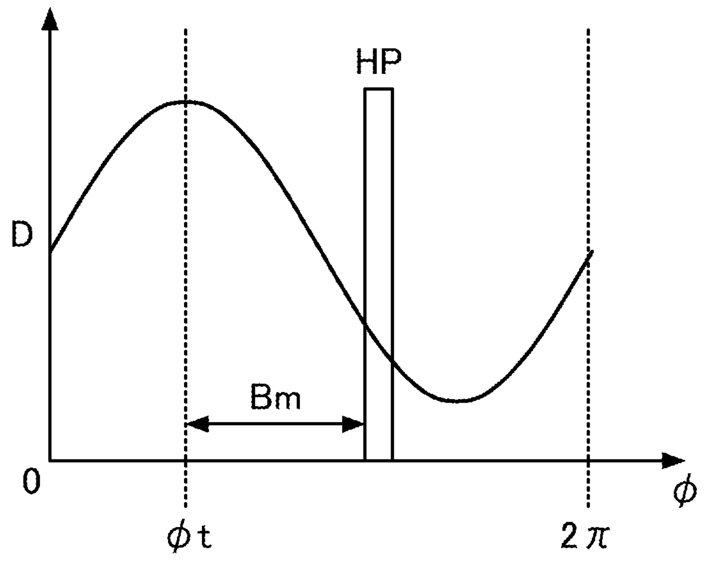
FIG. 27 is a diagram illustrating a detection operation of the density-unevenness phase difference of the image forming apparatus according to the second modification of the present disclosure.
Figure 28:
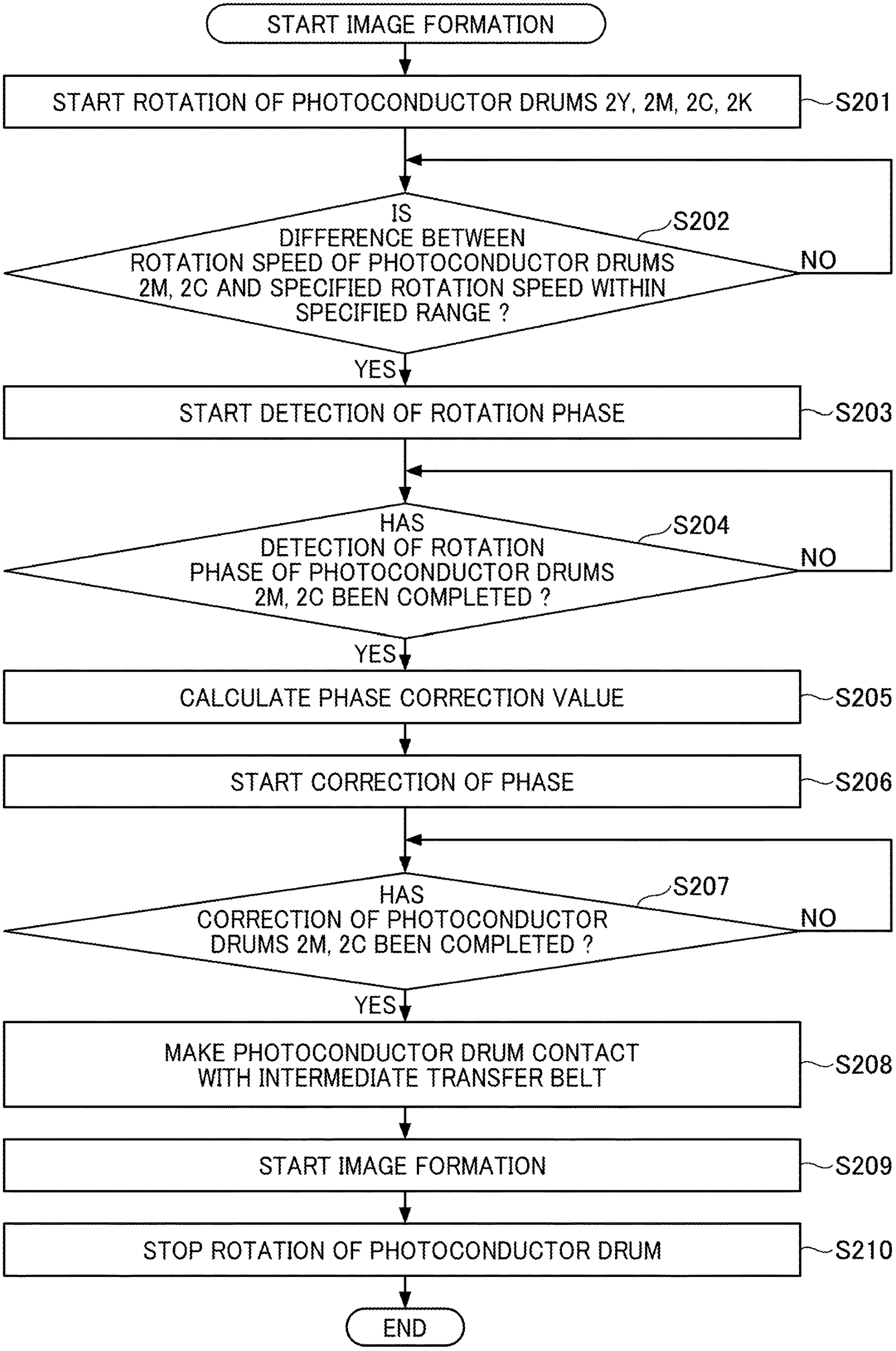
FIG. 28 is a flowchart of a first example of an operation of the image forming apparatus according to the second modification of the present disclosure.
Figure 29:
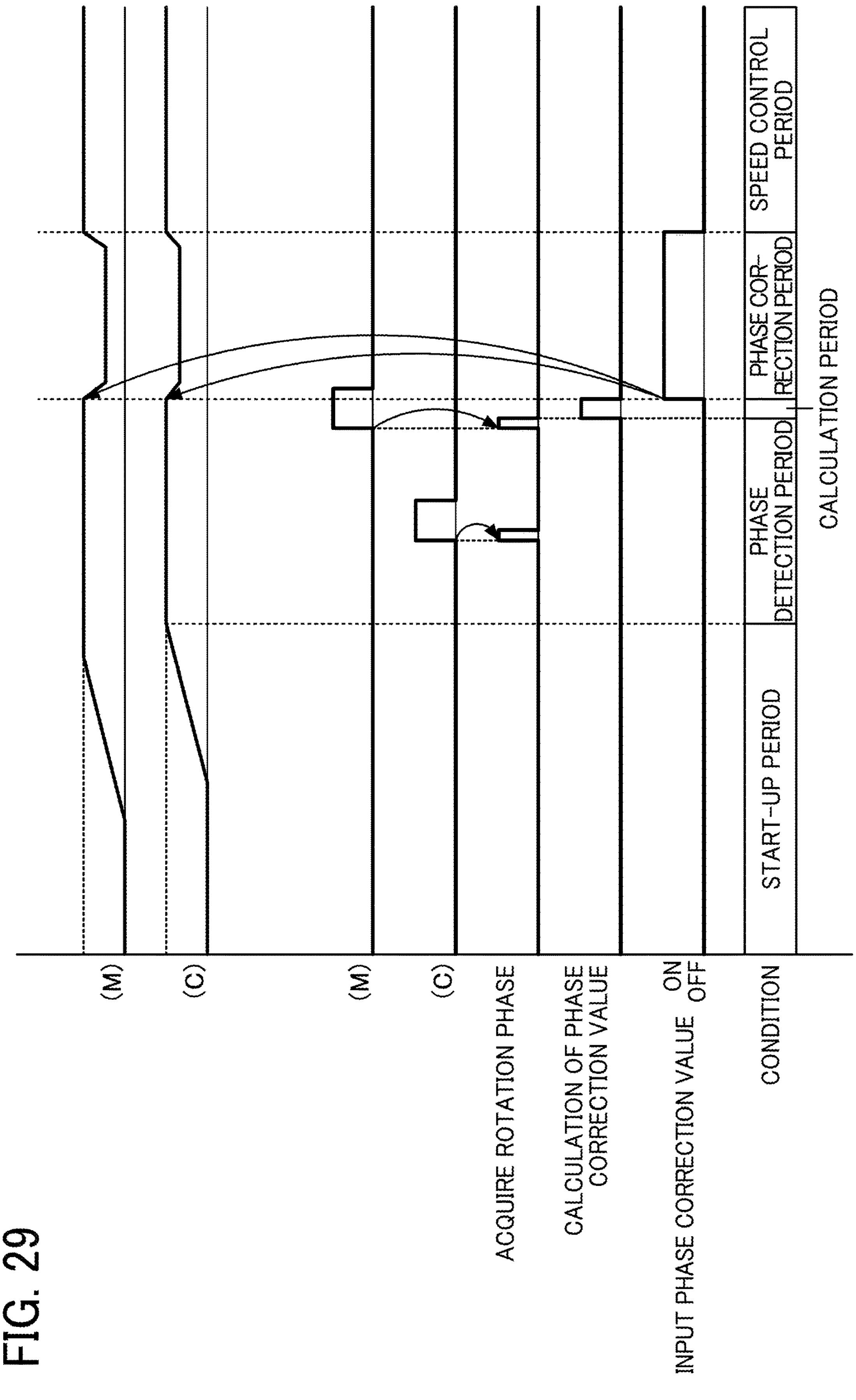
FIG. 29 is a timing chart of the operation of the image forming apparatus according to the second modification of the present disclosure.
Figure 30A:
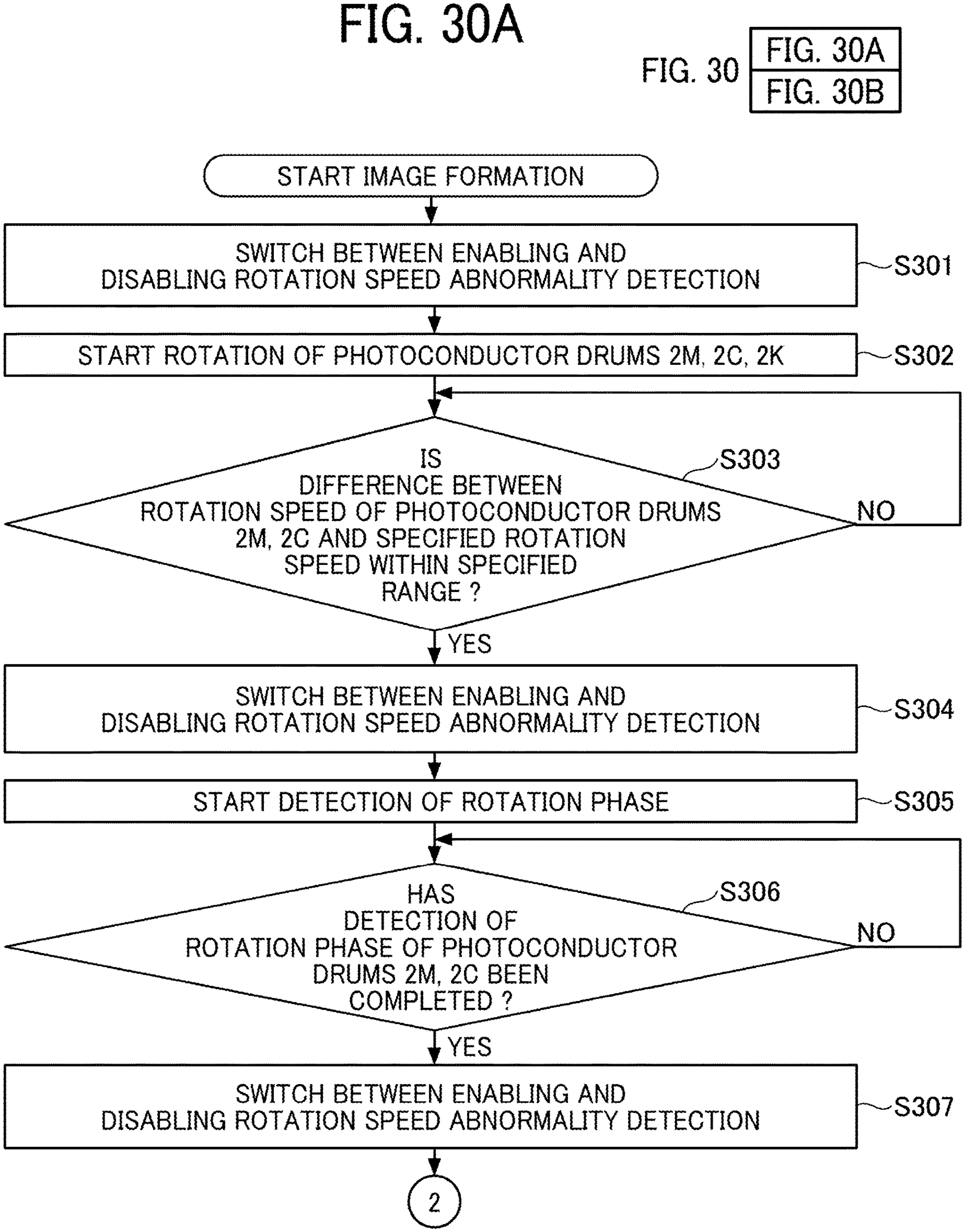
FIG. 30 including FIG. 30A
FIG. 30B is a flowchart of a second example of the operation of the image forming apparatus according to the second modification of the present disclosure.
Figure 30B:
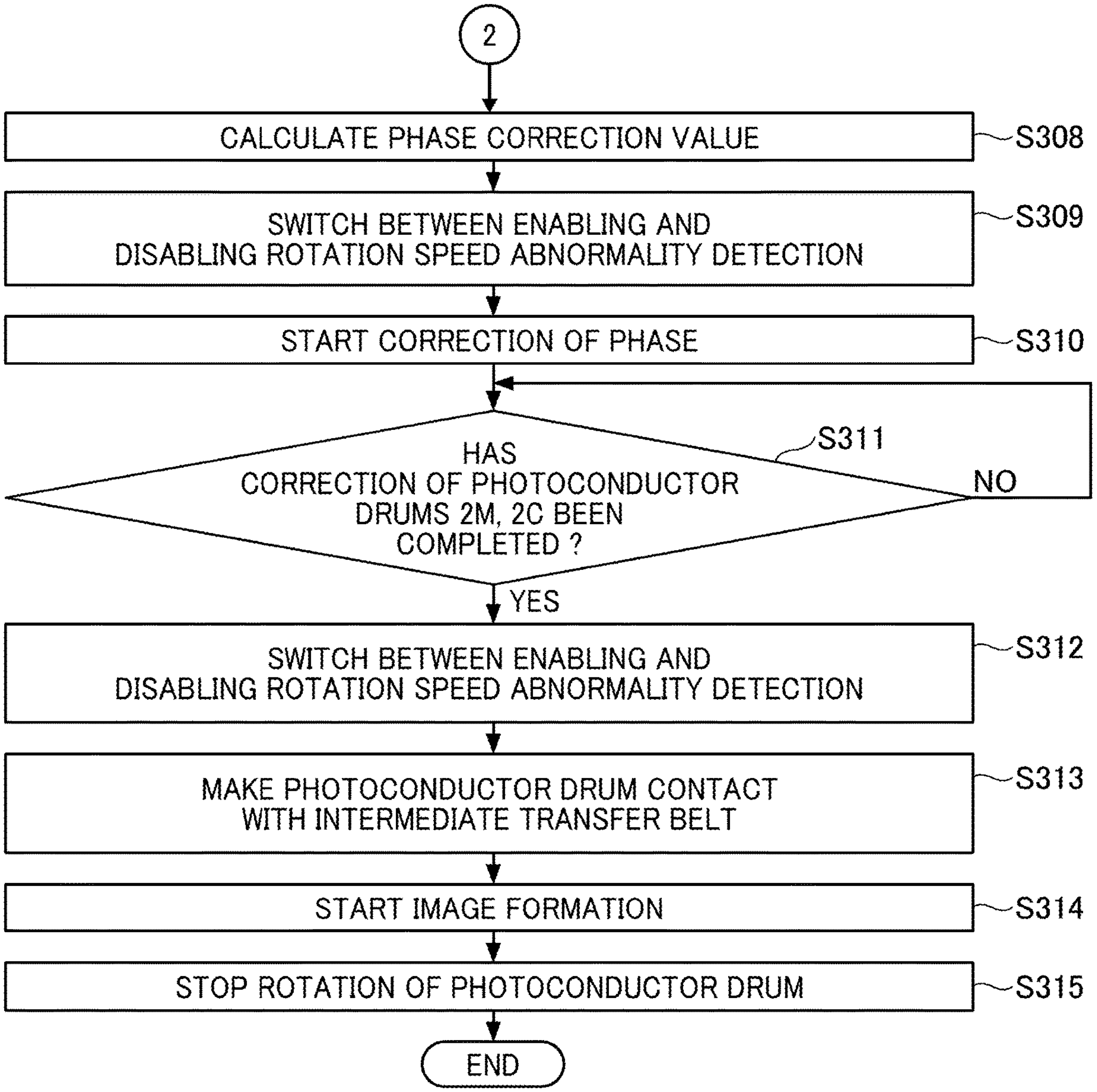

FIG. 20 is a diagram illustrating density unevenness according to a comparative example of a second modification. FIG. 21 is a diagram illustrating color unevenness when the density unevenness illustrated in FIG. 20 is transferred to a recording sheet. FIG. 22 is a diagram illustrating density unevenness of each color in the image forming apparatus according to the second modification. FIG. 23 is a diagram illustrating color unevenness when the density unevenness of FIG. 22 is transferred to a recording sheet. FIG. 24 is a diagram illustrating a state at a start of control by the image forming apparatus according to the second modification. FIG. 25 is a diagram illustrating a state at an end of control by the image forming apparatus according to the second modification. FIG. 26 is a diagram illustrating density unevenness in the image forming apparatus according to the second modification. FIG. 27 is a diagram illustrating the detection operation of rotation phase of the photoconductor drum of the image forming apparatus according to the second modification. FIG. 28 is a flowchart of an operation of the image forming apparatus according to the second modification. FIG. 29 is a timing chart illustrating the operation of the image forming apparatus according to the second modification. FIG. 30 is a flowchart of a second example of the operation of the image forming apparatus according to the second modification.

The functions and operations of the image forming apparatus **100*b* are the same as those of the image forming apparatus 100 before the image forming process. In FIGS. 20 to 28, the function and operation are the same as those in a case where the two color image of C and M is printed by the image forming apparatus 100. In FIG. 20, the description of FIG. 3 except for Ye can be applied as it is. The descriptions of FIGS. 4, 5, and 6 can be applied to FIGS. 21, 22, and 23, respectively. The descriptions of FIGS. 7 and 8 can be applied to FIGS. 24 and 25, respectively. The descriptions of FIGS. 13 and 14 can be applied to FIGS. 26 and 27 by replacing the photoconductor drum 2Y with 2C and replacing A=C−(Be−Bm). The description of FIG. 10 can be applied to FIG. 28 by replacing the operation after S202 with that of FIG. 10 except for the photoconductor drum 2Y. The description of FIG. 11 can be applied to FIG. 29 except for the photoconductor drum 2Y. The description of FIG. 10 can be applied to FIG. 30 except for the photoconductor drum 2Y from step S303 of FIG. 30**.

Third Modification

Figure 31:
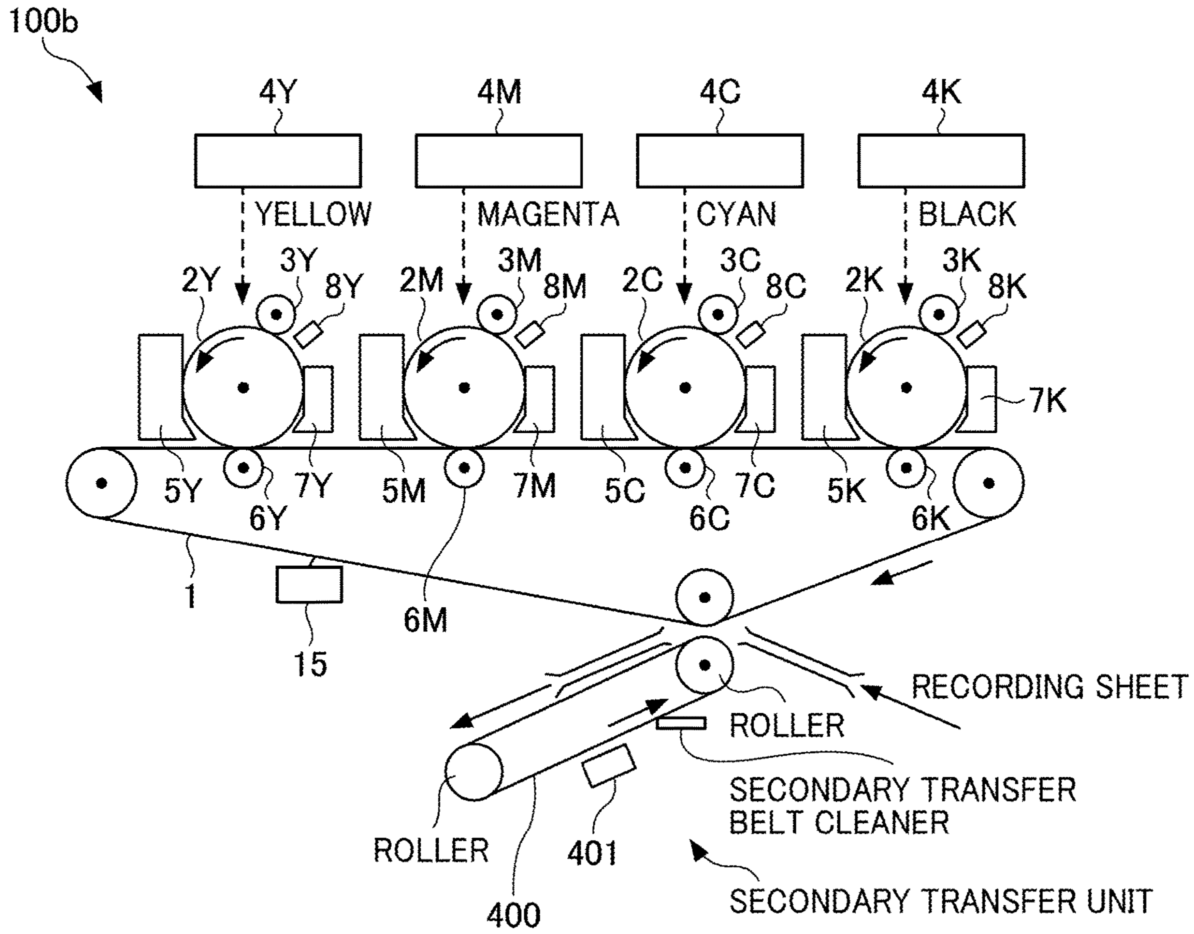
FIG. 31 is a diagram illustrating an overall configuration of an image forming apparatus according to a third modification of the present disclosure.

FIG. 31 is a diagram illustrating an overall configuration of the image forming apparatus **100*b*** according to a third modification.

The image forming apparatus **100*b* causes the optical writing units 4Y, 4M, 4C, and 4K to form latent images on the photoconductor drums 2Y, 2M, 2C, and 2K, respectively. The image forming apparatus 100*b* causes the chargers 3Y, 3M, 3C, and 3K and the developing units 5Y, 5M, 5C, and 5K to develop the latent images formed on the photoconductor drums 2Y, 2M, 2C, and 2**K, respectively.

The image forming apparatus **100*b* primarily transfers the toner images developed on the photoconductor drums 2Y, 2M, 2C, and 2K to the intermediate transfer belt 1 using transfer biases from the primary transfer rollers 6Y, 6M, 6C, and 6K, respectively. The image forming apparatus 100*b* secondarily transfers the toner images transferred on the intermediate transfer belt 1 onto the conveyed recording sheet by using the secondary transfer unit including a secondary transfer belt 400. The image forming apparatus 100*b* transfers the toner image not to the recording sheet but to the secondary transfer belt 400, and detects the toner density by a sensor 401 on the secondary transfer belt 400 to detect the density unevenness. Also in the image forming apparatus 100*b* described above, the substantially same effects as those of the image forming apparatus 100 can be obtained. Further, by generating the latent image in accordance with the detection of the rotation origin HP of the photoconductor drum 2, the initial phase of the rotation origin HP and the phase $\varphi t$ of the density unevenness can be acquired by using the sensor 401 on the secondary transfer belt 400**.

The above-described embodiments are just examples and do not limit the present disclosure. Modifications and variations of the embodiments can be made without departing from the spirit and scope of the disclosure described in the claims unless limited in the above description.

The numbers such as ordinal numbers and numerical values that indicates quantity are all given by way of example to describe the technologies to implement the embodiments of the present disclosure, and no limitation is indicated to the numbers given in the above description. In addition, the above-described connections among the components are examples for specifically describing the technology of the present disclosure, and connections for implementing functions of the present disclosure are not limited to the above-described examples.

Each function of the embodiments described above can be implemented by one or more processing circuits. The “processing circuit” in the present specification includes a processor programmed to execute each function by software like a processor implemented by an electronic circuit, and a device such as an application specific integrated circuit (ASIC), a digital signal processor (DSP), a field programmable gate array (FPGA), or a conventional circuit module designed to execute each function described above.

Aspects of the present disclosure are, for example, as follows.

First Aspect

A control device includes a detection unit and a control unit. The detection unit detects density unevenness of a toner image occurring according to a rotation cycle of a first image bearer for a first color among a plurality of rotatable image bearers, based on a rotation phase of the first image bearer and a density of the toner image formed on the first image bearer, and detects density unevenness of a toner image occurring according to a rotation cycle of a second image bearer for a second color among the plurality of image bearers, based on a rotation phase of the second image bearer and a density of the toner image formed on the second image bearer. The control unit controls rotation phases of the plurality of image bearers based on detection results of the plurality of image bearers by the detection unit and rotation speeds of the plurality of image bearers, corrects the rotation phase of the first image bearer based on a detection result of the first image bearer by the detection unit and a rotation speed of the first image bearer, corrects the rotation phase of the second image bearer based on a detection result of the second image bearer by the detection unit and a rotation speed of the second image bearer, and controls the rotation speeds of at least two of the plurality of image bearers to be a specified rotation speed. The circuitry starts a detection operation of the rotation phases of the plurality of image bearers after a difference between each of the rotation speeds of the at least two of the plurality of image bearers and the specified rotation speed falls within a specified range.

Second Aspect

The control device according to aspect 1 further includes a detection unit that detects density unevenness of a toner image on a third image bearer for a third color occurring according to a rotation phase of the third image bearer and a rotation cycle of the third image bearer. The control unit corrects the rotation phase of the third image bearer based on a detection result of the third image bearer and a rotation speed of the third image bearer.

Third Aspect

The control device according to aspect 2 that the detection unit starts calculating rotation phases of the at least two of the plurality of image bearers after a detection operation of the rotation phases of the at least two of the plurality of image bearers has ended.

Fourth Aspect

The control device according to aspect 3 that the control unit starts correcting density unevenness of the at least two of the plurality of image bearers after the calculating of the rotation phases of the at least two of the plurality of image bearers has ended.

Fifth Aspect

The control device according to aspect 4 that the control unit starts controlling the rotation speeds of the plurality of image bearers after the correcting of the density unevenness of the at least two of the plurality of image bearers has ended.

Sixth Aspect

The control device according to any one of aspects 1 to 5 that the detection unit detects a rotation origin of the first image bearer, a rotation origin of the second image bearer, and a rotation origin of the third image bearer. The detection unit detects the density unevenness of the toner image occurring according to each of the rotation cycle of the first image bearer, the rotation cycle of the second image bearer, and the rotation cycle of the third image bearer.

Seventh Aspect

The control device according to aspect 6 that the rotation origin of the first image bearer rotates with the rotation of the first image bearer. The rotation origin of the second image bearer rotates with the rotation of the second image bearer. The rotation origin of the third image bearer rotates with the rotation of the third image bearer.

Eighth Aspect

The control device according to any one of aspects 1 to 7 that the detection unit detects a difference between rotation phases of the at least two of the plurality of image bearers.

Ninth Aspect

The control device according to aspect 8 that the control unit matches phases of density unevenness between the at least two of the plurality of image bearers, based on the phases of the density unevenness and the difference between the rotation phrases of the at least two of the plurality of image bearers, to correct the density unevenness of the at least two of the plurality of image bearers.

Tenth Aspect

The control device according to any one of aspects 1 to 9 that the control unit controls the rotation phases of the plurality of image bearers to match phases of density unevenness between the at least two of the plurality of image bearers.

Eleventh Aspect

The control device according to any one of aspects 1 to 10 further includes an abnormality detection unit that detects the rotation speeds of the plurality of image bearers. The control unit determines whether a difference between each of the rotation speeds of the plurality of image bearers and the specified rotation speed falls within the specified range, determines whether detection by the abnormality detection unit is to be enabled, in response to a determination that the difference does not fall within the specified range, and switches between enabling and disabling of the detection by the abnormality detection unit.

Twelfth Aspect

The control device according to aspect 11 that the control unit determines that the difference between each of the rotation speeds of the plurality of image bearers and the specified rotation speed does not fall within the specified range, in a case where any one of the rotation speeds of the plurality of image bearers deviates from a predetermined range from a minimum speed to a maximum speed for a specified time.

Thirteenth Aspect

The control device according to aspect 11 or 12 that the control unit outputs a determination result of enabling the detection by the abnormality detection unit in a position detection period, a position correction value calculation period, and a speed control period, and disabling the detection by the abnormality detection unit in a start-up period and a position correction period.

Fourteenth Aspect

The control device according to any one of aspects 11 to 13 that the control unit switches between enabling and disabling of the detection by the abnormality detection unit, based on the determination result.

Fifteenth Aspect

An image forming apparatus includes the control device according to any one of aspects 1 to 14, the plurality of image bearers, and a plurality of forming devices that form devices form the toner images on the plurality of image bearers.

Sixteenth Aspect

An image forming method for an image forming apparatus, the method includes forming toner images on a plurality of rotatable image bearers with a plurality of forming devices of the image forming apparatus, detecting density unevenness of a toner image occurring according to a rotation cycle of a first image bearer among the plurality of image bearers, based on a rotation phase of the first image bearer and a densify of the toner image formed on the first image bearer, detecting density unevenness of a toner image occurring according to a rotation period of a second image bearer among the plurality of image bearers, based on a rotation phase of the second image bearer and a density of the toner image formed on the second image bearer, controlling rotation phases of the plurality of image bearers based on detection results of the plurality of image bearers and rotation speeds of the plurality of image bearers, correcting the rotation phase of the first image bearer based on a detection result of the first image bearer and a rotation speed of the first image bearer, correcting the rotation phase of the second image bearer based on a detection result of the second image bearer and a rotation speed of the second image bearer, controlling rotation speeds of at least two of the plurality of image bearers to be a specified rotation speed, and starting a detection operation of the rotation phases of the plurality of image bearers after a difference between each of the rotation speeds of the at least two of the plurality of image bearers and the specified rotation speed falls within a specified range.

Seventeenth Aspect

A storage medium storing a plurality of instructions which, when executed by one or more processors, cause the processors to execute a method that includes forming toner images on a plurality of rotatable image bearers with a plurality of forming devices of an image forming apparatus, detecting density unevenness of a toner image occurring according to a rotation cycle of a first image bearer among the plurality of image bearers, based on a rotation phase of the first image bearer and a densify of the toner image formed on the first image bearer, detecting density unevenness of a toner image occurring according to a rotation period of a second image bearer among the plurality of image bearers, based on a rotation phase of the second image bearer and a density of the toner image formed on the second image bearer, controlling rotation phases of the plurality of image bearers based on detection results of the plurality of image bearers and rotation speeds of the plurality of image bearers, correcting the rotation phase of the first image bearer based on a detection result of the first image bearer and a rotation speed of the first image bearer, correcting the rotation phase of the second image bearer based on a detection result of the second image bearer and a rotation speed of the second image bearer, controlling rotation speeds of at least two of the plurality of image bearers to be a specified rotation speed, and starting a detection operation of the rotation phases of the plurality of image bearers after a difference between each of the rotation speeds of the at least two of the plurality of image bearers and the specified rotation speed falls within a specified range.

The above-described embodiments are illustrative and do not limit the present invention. Thus, numerous additional modifications and variations are possible in light of the above teachings. For example, elements and/or features of different illustrative embodiments may be combined with each other and/or substituted for each other within the scope of the present invention.

Any one of the above-described operations may be performed in various other ways, for example, in an order different from the one described above.

The functionality of the elements disclosed herein may be implemented using circuitry or processing circuitry which includes general purpose processors, special purpose processors, integrated circuits, application specific integrated circuits (ASICs), digital signal processors (DSPs), field programmable gate arrays (FPGAs), conventional circuitry and/or combinations thereof which are configured or programmed to perform the disclosed functionality. Processors are considered processing circuitry or circuitry as they include transistors and other circuitry therein. In the disclosure, the circuitry, units, or means are hardware that carry out or are programmed to perform the recited functionality. The hardware may be any hardware disclosed herein or otherwise known which is programmed or configured to carry out the recited functionality. When the hardware is a processor which may be considered a type of circuitry, the circuitry, means, or units are a combination of hardware and software, the software being used to configure the hardware and/or processor.

The invention claimed is:

1. A control device for controlling a rotation of a plurality of rotatable image bearers corresponding to different colors respectively, the control device comprising circuitry configured to:

receive a density of a toner image formed on each of the plurality of image bearers, the density detected by a toner density sensor;

receive a rotation phase of each of the plurality of image bearers relative to a rotation origin of the each of the plurality of the image bearers, the rotation phase detected by a rotation-phase detector;

determine a first density unevenness of the toner image occurring according to a rotation of a first image bearer for a first color among the plurality of rotatable image bearers, based on the rotation phase of the first image bearer relative to the rotation origin and a variation in the density of the toner image formed on the first image bearer;

determine a second density unevenness of the toner image occurring according to a rotation of a second image bearer for a second color among the plurality of image bearers, based on the rotation phase of the second image bearer relative to the rotation origin and a variation in the density of the toner image formed on the second image bearer;

correct the rotation phase of the first image bearer based on the first density unevenness and a rotation speed of the first image bearer;

correct the rotation phase of the second image bearer based on the second density unevenness and a rotation speed of the second image bearer;

control the rotation speeds of the first image bearer and the second image bearer to be a specified rotation speed; and start detecting the rotation phase of each of the plurality of image bearers after a difference between each of the rotation speeds of the first image bearer and the second image bearer and the specified rotation speed falls within a specified range.

2. The control device according to claim 1, wherein the circuitry is configured to:

determine a third density unevenness of the toner image occurring according to a rotation of a third image bearer for a third color among the plurality of image bearers, based on a rotation phase of the third image bearer relative to the rotation origin and a variation in the density of the toner image formed on the third image bearer; and correct the rotation phase of the third image bearer based on the third density unevenness and a rotation speed of the third image bearer.

3. The control device according to claim 2, wherein the circuitry is configured to start determining the density unevenness of at least two of the first image bearer, the second image bearer, and the third image bearer after detecting the rotation phases of the at least two of the first image bearer, the second image bearer, and the third image bearer has ended.

4. The control device according to claim 3, wherein the circuitry is configured to start correcting the density unevenness of the at least two of the first image bearer, the second image bearer, and the third image bearer after the determining of the density unevenness of the at least two of the first image bearer, the second image bearer, and the third image bearer has ended.

5. The control device according to claim 4, wherein the circuitry is configured to start controlling the rotation speeds of the at least two of the first image bearer, the second image bearer, and the third image bearer after the correcting of the density unevenness of the at least two of the first image bearer, the second image bearer, and the third image bearer has ended.

6. The control device according to claim 2, wherein the rotation origin of the first image bearer rotates with rotation of the first image bearer, wherein the rotation origin of the second image bearer rotates with rotation of the second image bearer, and wherein the rotation origin of the third image bearer rotates with rotation of the third image bearer.

7. The control device according to claim 1, wherein the circuitry is configured to detect a difference between rotation phases of the first image bearer and the second image bearer.

8. The control device according to claim 7, wherein the circuitry is configured to match phases of density unevenness between the first image bearer and the second image bearer, based on the phases of the density unevenness and the difference between the rotation phrases of the first image bearer and the second image bearer, to correct the density unevenness of the first image bearer and the second image bearer.

9. The control device according to claim 1, wherein the circuitry is configured to control the rotation phases of the plurality of image bearers to match phases of density unevenness between the first image bearer and the second image bearer.

10. The control device according to claim 1, wherein the circuitry is configured to:

detect an abnormality in the rotation speeds of the plurality of image bearers;

determine whether a difference between each of the rotation speeds of the plurality of image bearers and the specified rotation speed falls within the specified range;

determine whether abnormality detection is to be enabled, in response to a determination that the difference does not fall within the specified range; and switch between enabling and disabling of the abnormality detection.

11. The control device according to claim 10, wherein the circuitry is configured to determine that the difference between each of the rotation speeds of the plurality of image bearers and the specified rotation speed does not fall within the specified range, in a case where any one of the rotation speeds of the plurality of image bearers deviates from a predetermined range from a minimum speed to a maximum speed for a specified time.

12. The control device according to claim 10, wherein the circuitry is configured to output a determination result of enabling the abnormality detection in a position detection period, a position correction value calculation period, and a speed control period, and disabling the abnormality detection in a start-up period and a position correction period.

13. The control device according to claim 10, wherein the circuitry is configured to switch between enabling and disabling of the abnormality detection, based on the determination result.

14. An image forming apparatus comprising:

the control device according to claim 1;

the plurality of image bearers; and a plurality of forming devices configured to form toner images on the plurality of image bearers.

15. The control device according to claim 1, wherein the circuitry is further configured to:

calculate a density-unevenness phase difference between the first image bearer and the second image bearer, based on the first density unevenness, the second density unevenness, and a difference in the rotation phase between the first image bearer and the second image bearer;

calculate a phase correction value for each of the first image bearer and the second image bearer based on the density-unevenness phase difference; and correct rotation speeds of the first image bearer and the second image bearer, based on the phase correction value, such that the variation in the density of the toner image formed on the first image bearer match the variation in the density of the toner image formed on the second image bearer.

16. An image forming method for an image forming apparatus, the method comprising:

forming toner images on a plurality of rotatable image bearers corresponding to different colors respectively with a plurality of forming devices of the image forming apparatus;

receiving a density of a toner image formed on each of the plurality of image bearers, the density detected by a toner density sensor;

receiving a rotation phase of each of the plurality of image bearers relative to a rotation origin of the each of the plurality of the image bearers, the rotation phase detected by a rotation-phase detector;

determining a first density unevenness of the toner image occurring according to a rotation of a first image bearer for a first color among the plurality of image bearers, based on the rotation phase of the first image bearer relative to the rotation origin and a variation in the density of the toner image formed on the first image bearer;

determining a second density unevenness of the toner image occurring according to a rotation of a second image bearer for a second color among the plurality of image bearers, based on the rotation phase of the second image bearer relative to the rotation origin and a variation in the density of the toner image formed on the second image bearer;

correcting the rotation phase of the first image bearer based on the first density unevenness and a rotation speed of the first image bearer;

correcting the rotation phase of the second image bearer based on the second density unevenness and a rotation speed of the second image bearer;

controlling the rotation speeds of the first image bearer and the second image bearer to be a specified rotation speed; and starting detecting the rotation phase of each of the plurality of image bearers after a difference between each of the rotation speeds of the first image bearer and the second image bearer and the specified rotation speed falls within a specified range.

17. A non-transitory storage medium storing a plurality of instructions which, when executed by one or more processors, cause the processors to execute a method, comprising:

forming toner images on a plurality of rotatable image bearers corresponding to different colors respectively with a plurality of forming devices of an image forming apparatus;

receiving a density of a toner image formed on each of the plurality of image bearers, the density detected by a toner density sensor;

receiving a rotation phase of each of the plurality of image bearers relative to a rotation origin of the each of the plurality of the image bearers, the rotation phase detected by a rotation-phase detector;

determining a first density unevenness of the toner image occurring according to a rotation of a first image bearer for a first color among the plurality of image bearers, based on the rotation phase of the first image bearer relative to the rotation origin and a variation in the density of the toner image formed on the first image bearer;

determining a second density unevenness of the toner image occurring according to a rotation of a second image bearer for a second color among the plurality of image bearers, based on the rotation phase of the second image bearer relative to the rotation origin and a variation in the density of the toner image formed on the second image bearer;

correcting the rotation phase of the second image bearer based on the second density unevenness and a rotation speed of the second image bearer;

controlling the rotation speeds of the first image bearer and the second image bearer to be a specified rotation speed; and starting detecting the rotation phase of each of the plurality of image bearers after a difference between each of the rotation speeds of the first image bearer and the second image bearer and the specified rotation speed falls within a specified range.

* * * * *